United States Patent
Kuroki et al.

(10) Patent No.: US 6,916,898 B2
(45) Date of Patent: Jul. 12, 2005

(54) PROCESS FOR PRODUCING POLYIMIDE

(75) Inventors: Takashi Kuroki, Sodegaura (JP); Atsushi Shibuya, Sodegaura (JP); Shoji Tamai, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/221,501

(22) PCT Filed: Mar. 13, 2001

(86) PCT No.: PCT/JP01/01938

§ 371 (c)(1),
(2), (4) Date: Sep. 13, 2002

(87) PCT Pub. No.: WO01/68742

PCT Pub. Date: Sep. 20, 2001

(65) Prior Publication Data

US 2003/0158370 A1 Aug. 21, 2003

(30) Foreign Application Priority Data

| Mar. 13, 2000 | (JP) | 2000-73971 |
| Mar. 13, 2000 | (JP) | 2000-073972 |
| Mar. 13, 2000 | (JP) | 2000-73973 |
| Mar. 13, 2000 | (JP) | 2000-073974 |

(51) Int. Cl.[7] .................. C08G 73/10; C08G 69/26
(52) U.S. Cl. .................. 528/170; 528/125; 528/126; 528/128; 528/171; 528/172; 528/174; 528/176; 528/179; 528/183; 528/185; 528/188; 528/220; 528/229; 528/350; 528/351; 528/352; 528/353
(58) Field of Search .............. 528/125–126, 528/128, 171–174, 176, 179, 183, 185, 188, 220, 229, 350, 351, 352, 353

(56) References Cited

U.S. PATENT DOCUMENTS

| 4,568,715 | A |   | 2/1986  | Itatani et al. |
| 4,795,798 | A | * | 1/1989  | Tamai et al. ............. 528/185 |
| 4,847,349 | A | * | 7/1989  | Ohta et al. .............. 528/125 |
| 4,923,968 | A | * | 5/1990  | Kunimune et al. ........ 528/353 |
| 5,300,620 | A |   | 4/1994  | Okikawa et al. |
| 5,374,708 | A | * | 12/1994 | Tamai et al. ............. 528/353 |
| 6,451,955 | B1 | * | 9/2002 | Hausladen et al. ....... 528/170 |
| 6,458,912 | B1 |   | 10/2002 | Kuroki et al. |
| 6,780,960 | B2 | * | 8/2004 | Hausladen et al. ....... 528/170 |

FOREIGN PATENT DOCUMENTS

| EP | 511813 A2 | 11/1992 |
| JP | 04-142332 A | 5/1992 |
| JP | 6-220194 A | 8/1994 |
| JP | 09-302097 A | 11/1997 |
| JP | 2000-001545 A | 1/2000 |
| JP | 2000-103854 A | 4/2000 |
| JP | 2000-191781 A | 7/2000 |
| WO | 99/58595 A1 | 11/1999 |

OTHER PUBLICATIONS

S. Srinivas et al., "Semicrystalline Polyimides Based on Controlled Molecular Weight Phthalimide End–Capped 1,3–Bis(4–aminophenoxy)benzene and 3,3',4,4'–Biphenyltetracarboxylic Dianhydride: Synthesis, Crystallization, Melting, and Thermal Stability", Macromolecules 1997, pp. 1012–1022, vol. 30, No. 4.

S. Tamai et al., "Melt Processible Polyimides and Their Chemical Structures" Polymer 1996, pp. 3683–3692, vol. 37, No. 18, Elsevier Science Ltd., Great Britain.

S. Tamai et al., "Melt Processable Copolyimides Based on 4,4'–bis(3–aminophenoxy)biphenyl", Polymer, 1998, pp. 1945–1949. vol. 39, No. 10, Elsevier Science Ltd., Great Britain.

T. Nakano, "Soluble Aromatic Polyimides", 2nd Intern. Conf. on PI, 1985, pp. 163–181.

* cited by examiner

*Primary Examiner*—P. Hampton Hightower
(74) *Attorney, Agent, or Firm*—Burns, Doane, Swecker & Mathis, LLP

(57) ABSTRACT

A process of preparing a polyimide of the present invention comprises effecting an imidization reaction of a diamine and a tetracarboxylic dianhydride in a solvent containing 50 to 100% by weight of an equimolar composition of a nitrogen-containing cyclic compound indicated by chemical formula (1) below and a phenol indicated by chemical formula (2) below:

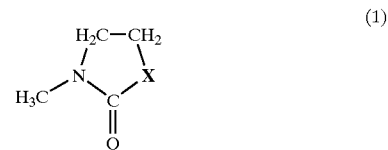

(1)

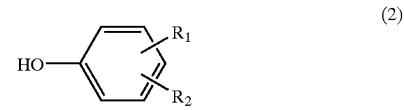

(2)

in formula (1), X represents —$CH_2$— or —$N(CH_3)$—, and in formula (2), $R_1$ and $R_2$ may be the same as, or different from, each other and represent each any one of —H, —OH, —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$OCH_3$, —$O(C_6H_5)$, —$NO_2$, —Cl, —Br and —F.

20 Claims, 12 Drawing Sheets

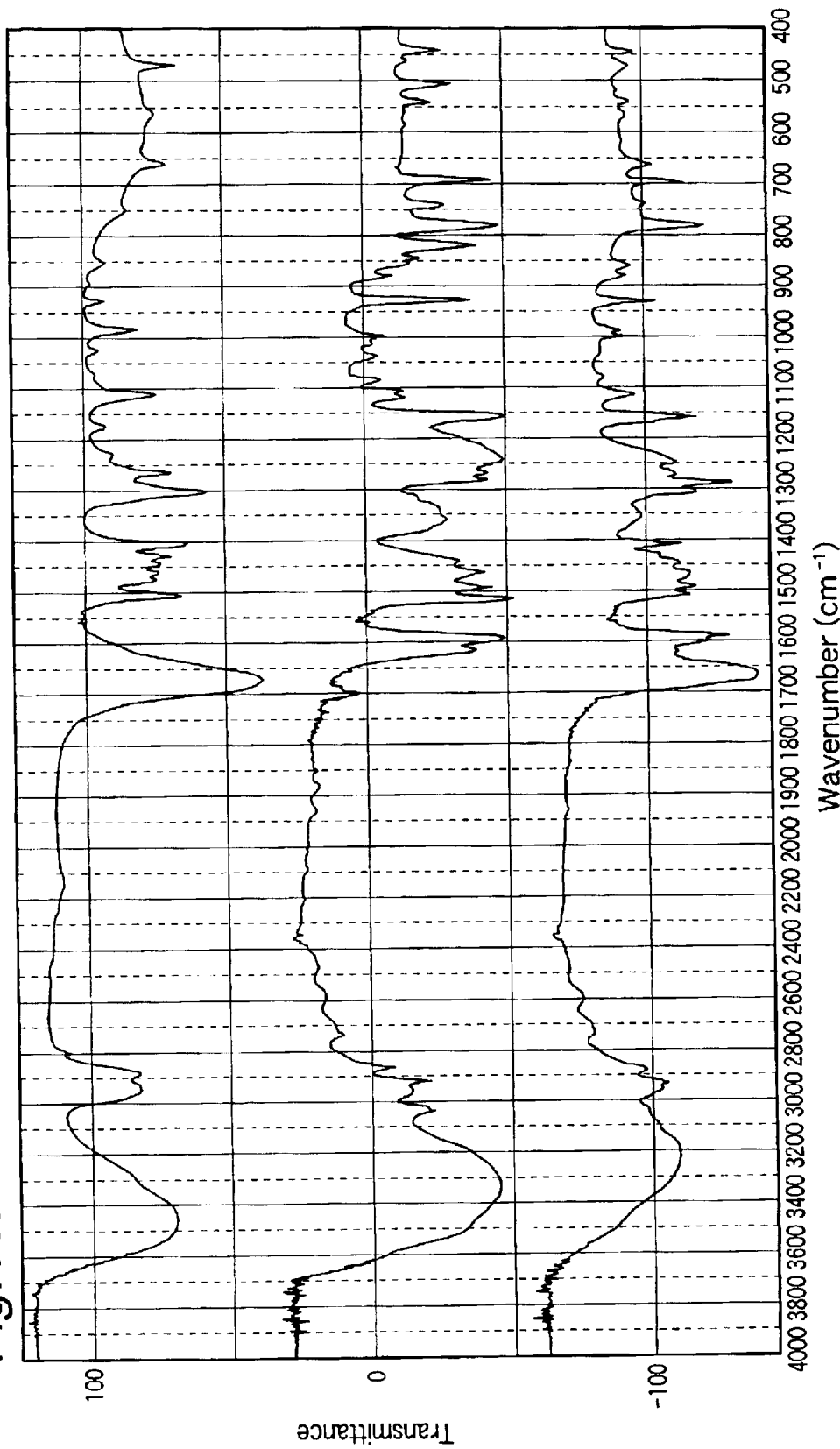

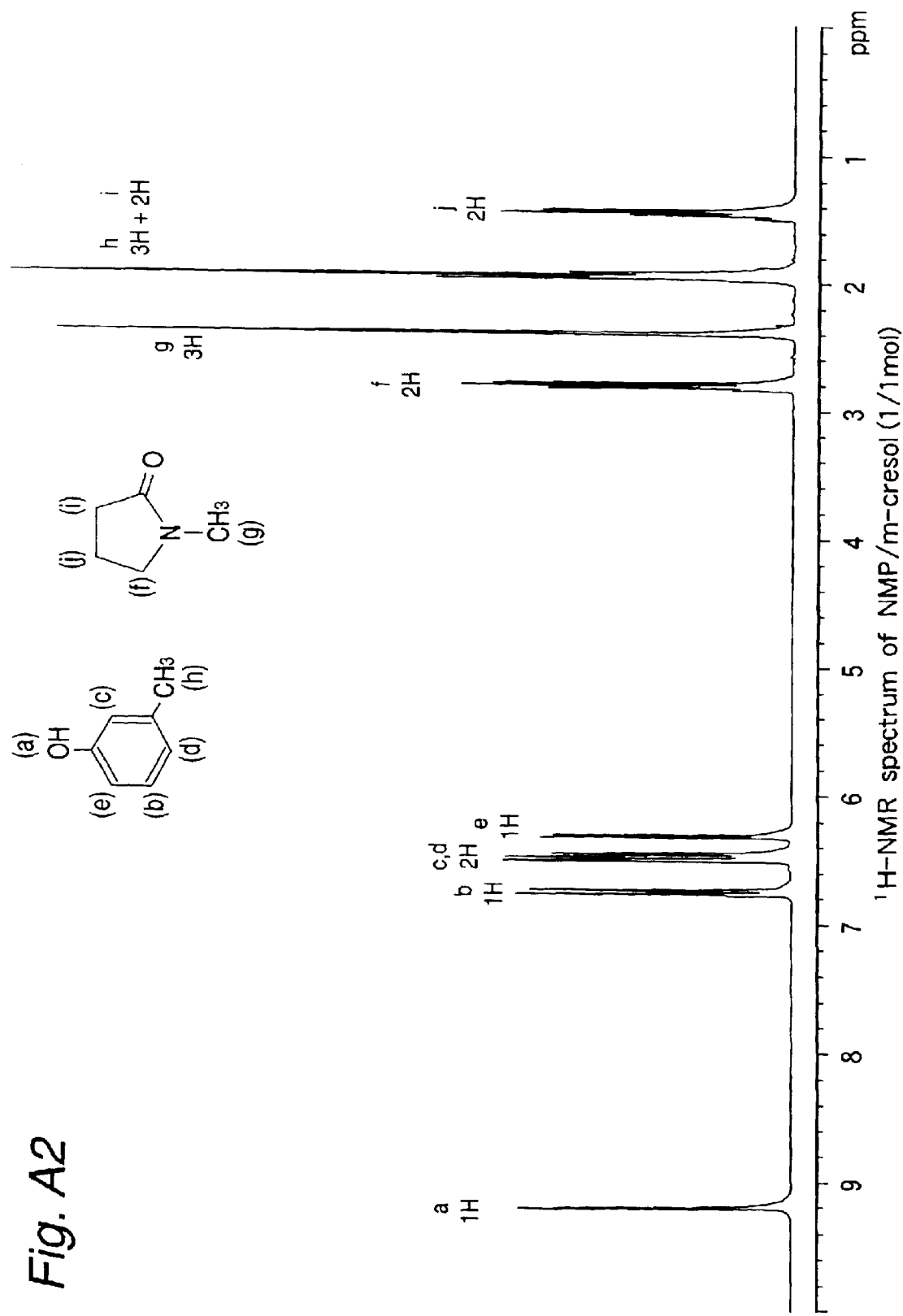
Fig. A2

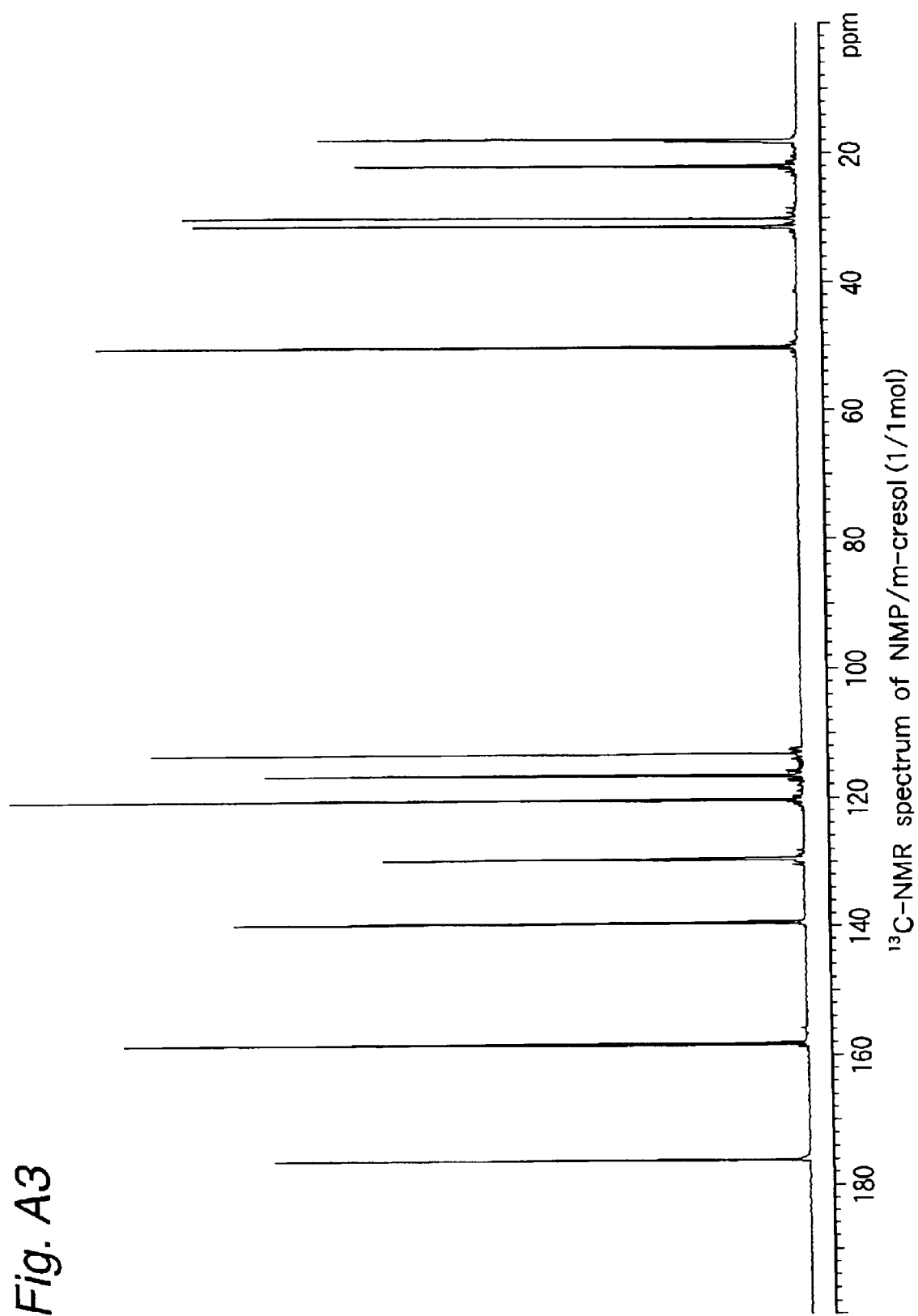
Fig. A3

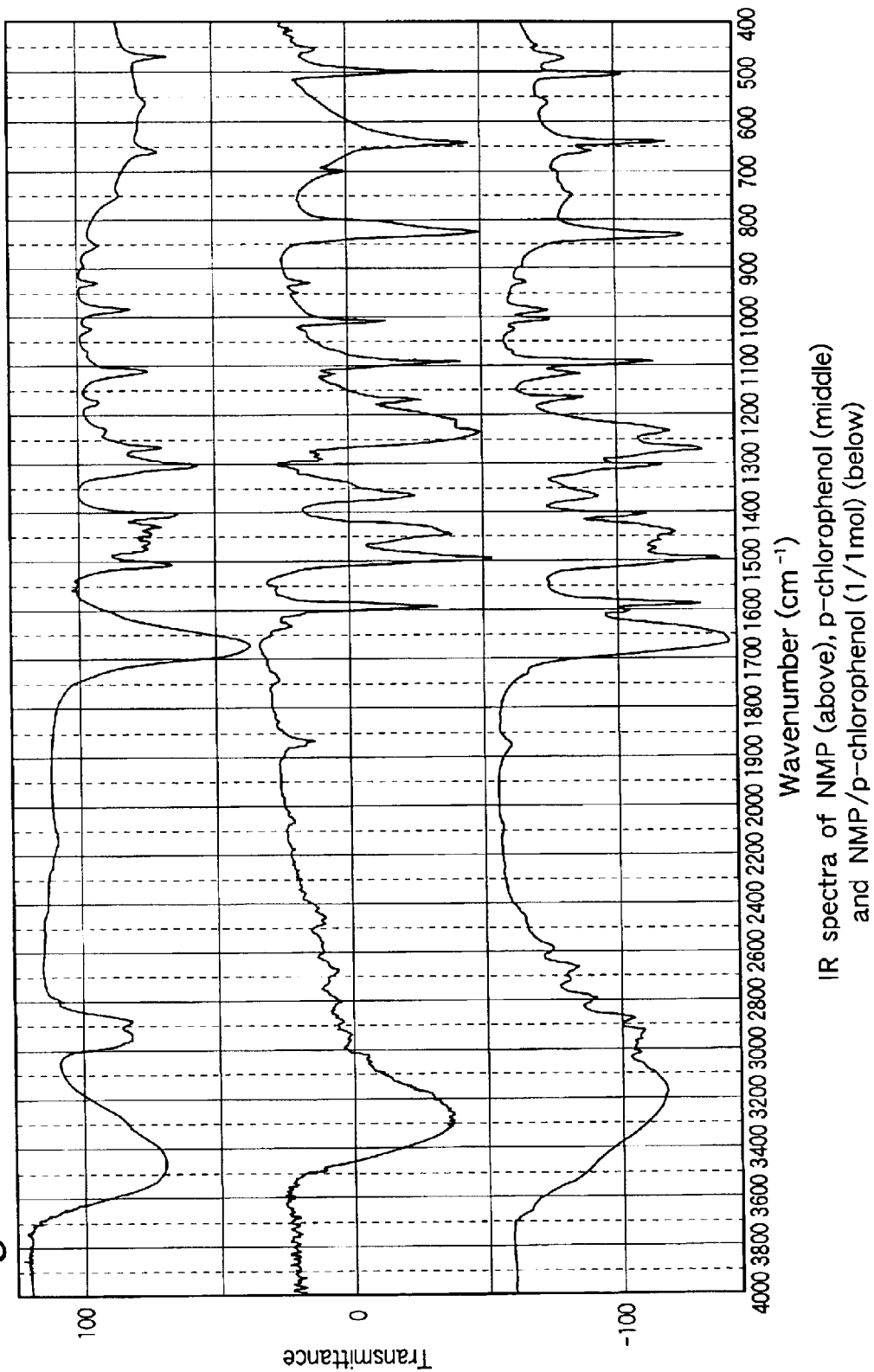
Fig. A4
IR spectra of NMP (above), p-chlorophenol (middle) and NMP/p-chlorophenol (1/1mol) (below)

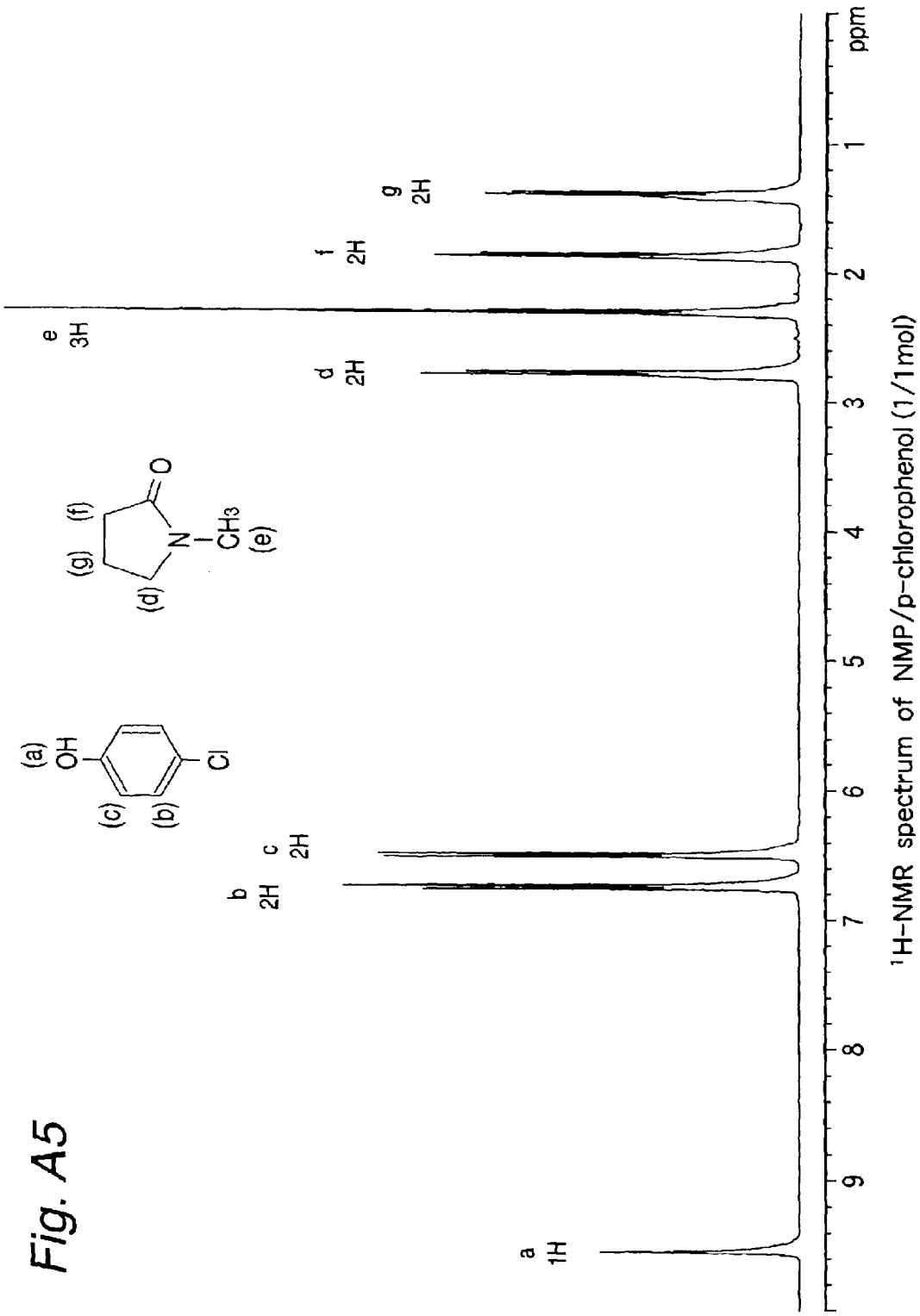
Fig. A5

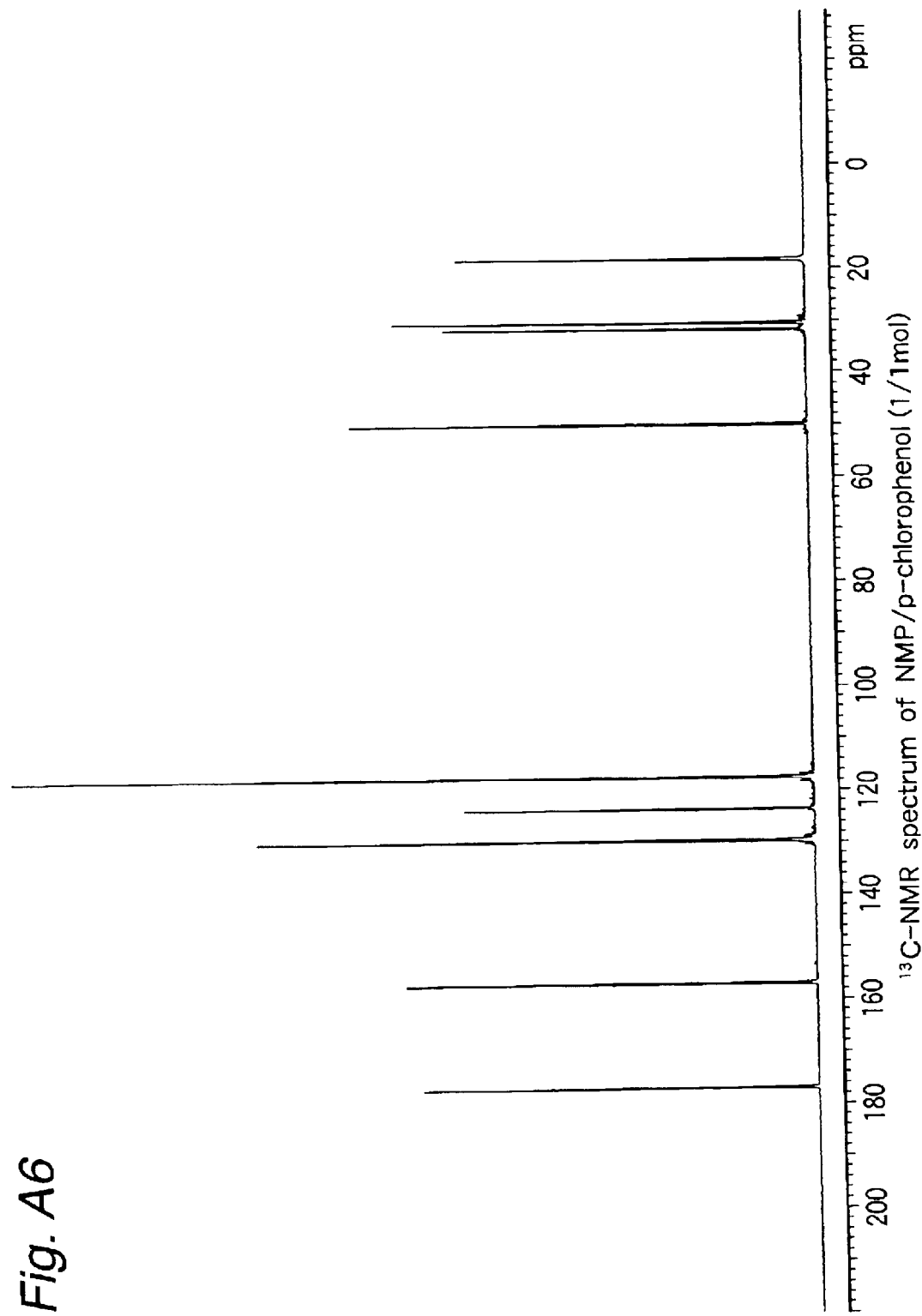
Fig. A6

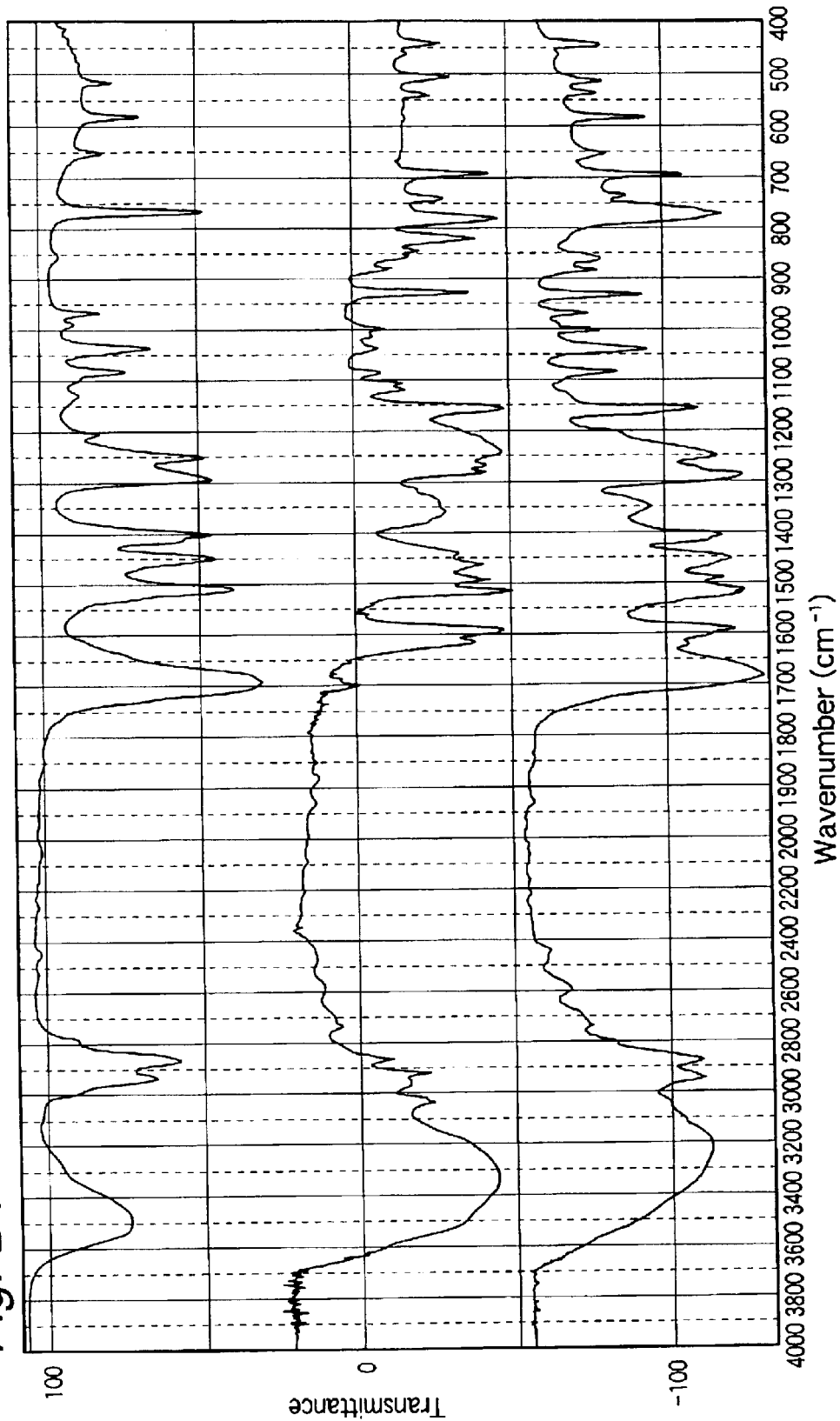

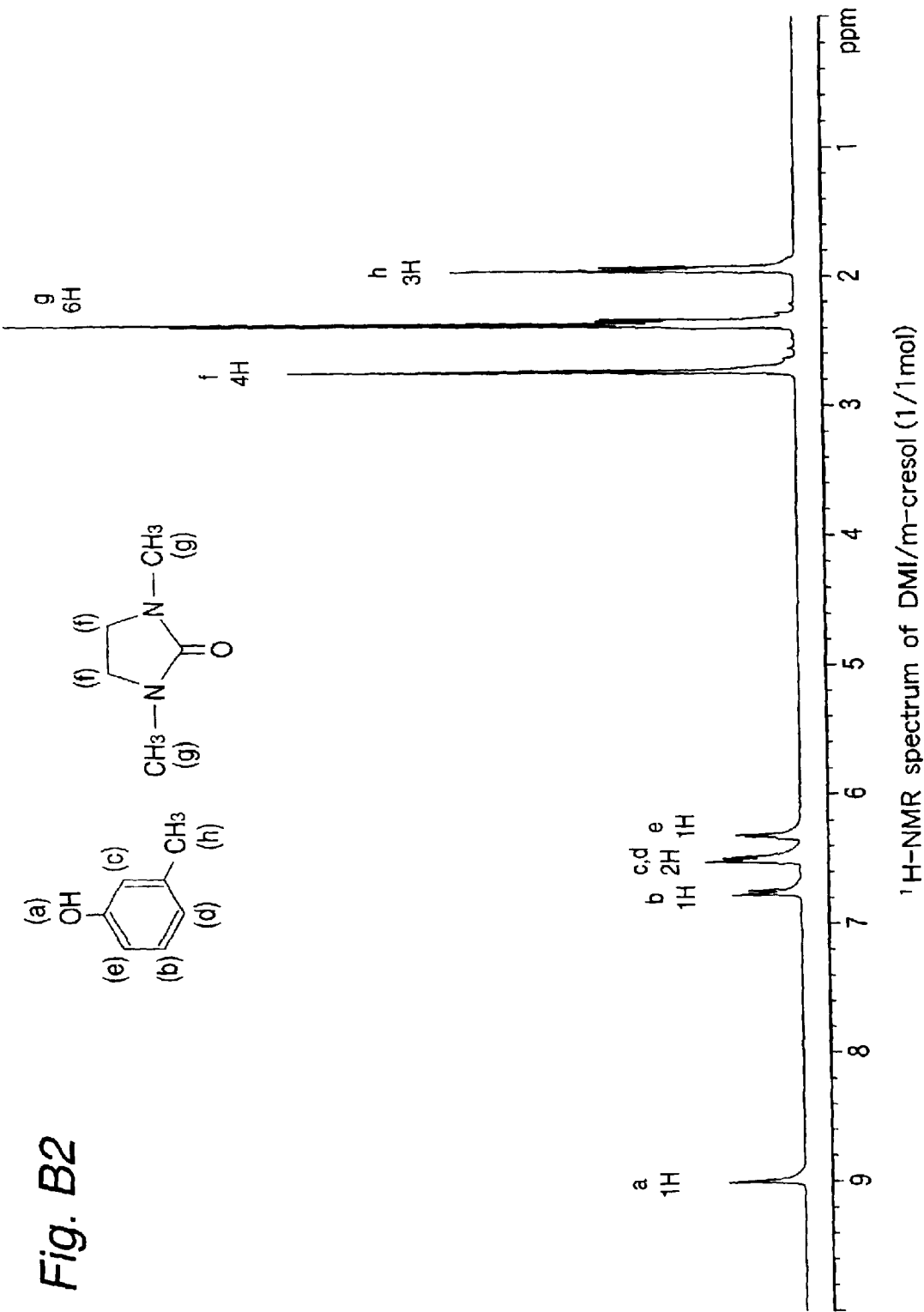
Fig. B2

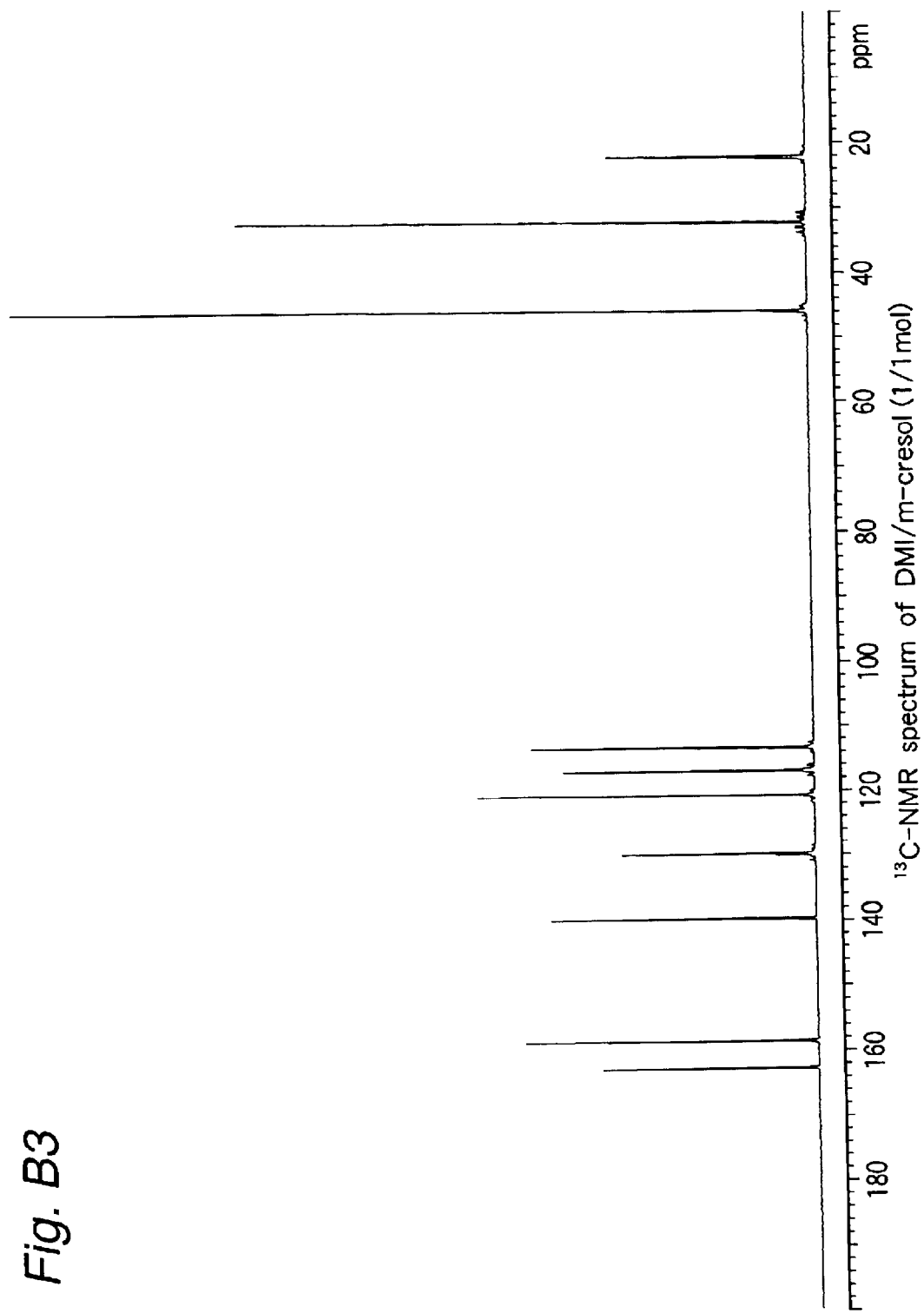
Fig. B3

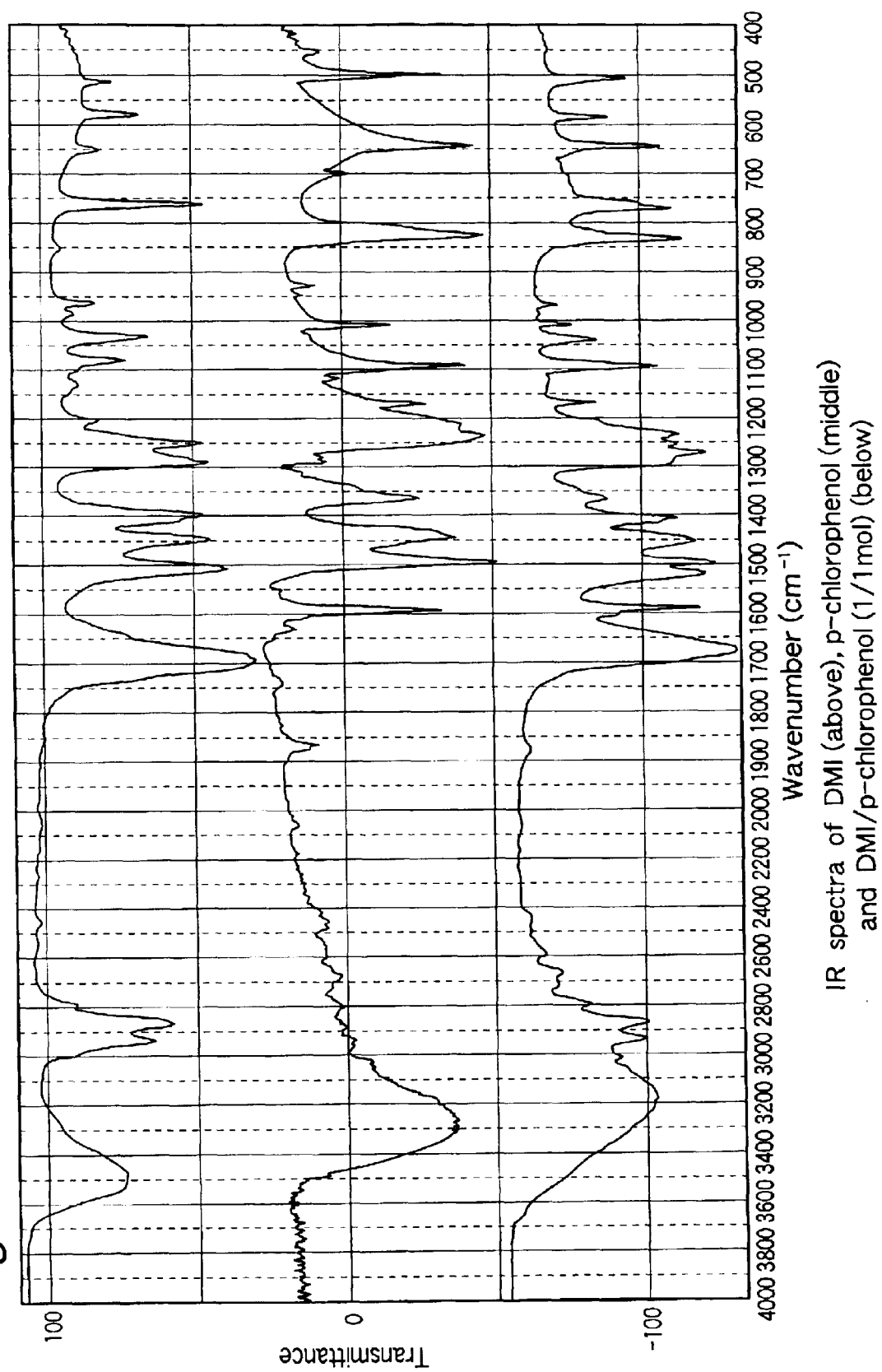
Fig. B4 IR spectra of DMI (above), p-chlorophenol (middle) and DMI/p-chlorophenol (1/1 mol) (below)

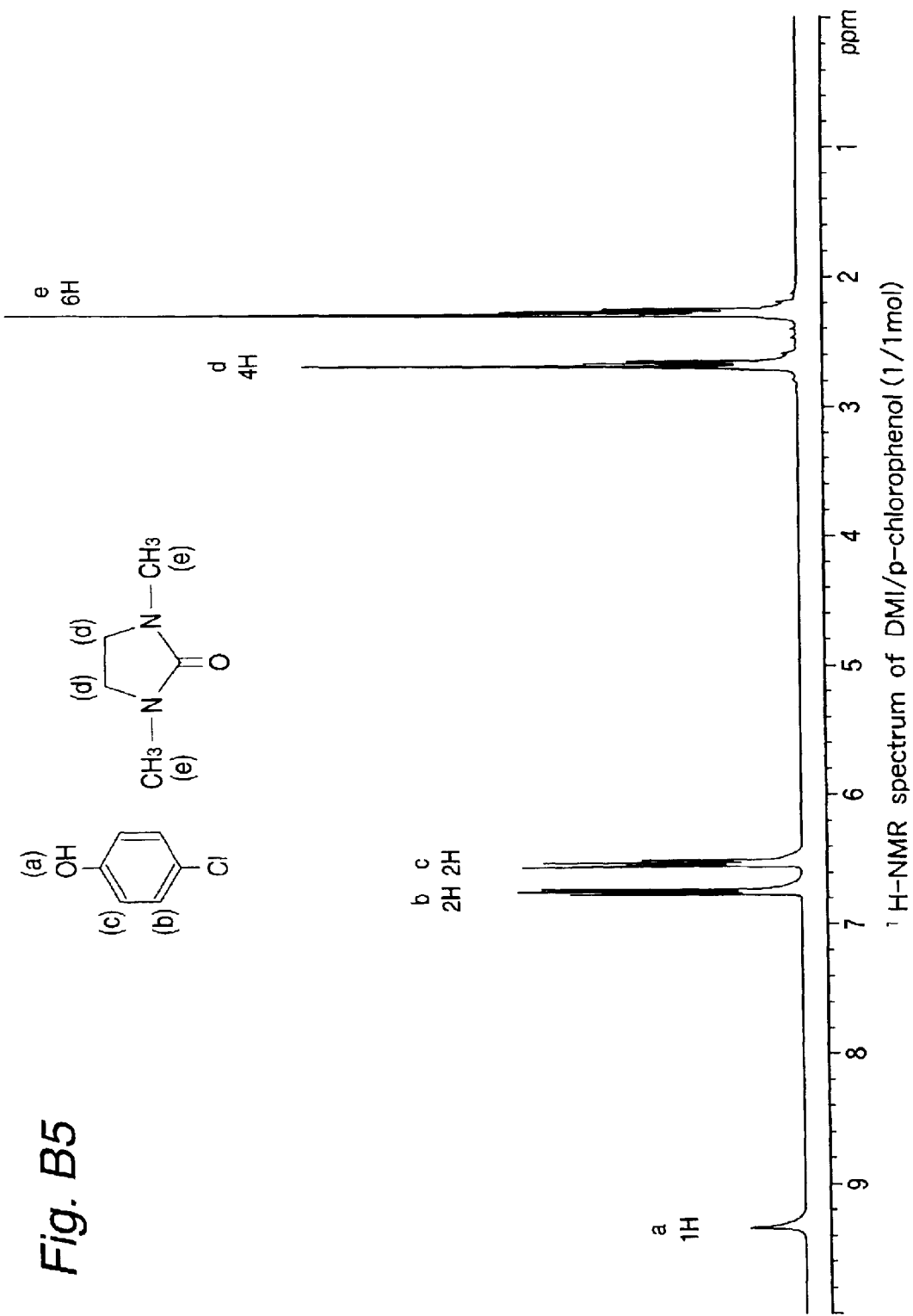
Fig. B5  ¹H-NMR spectrum of DMI/p-chlorophenol (1/1mol)

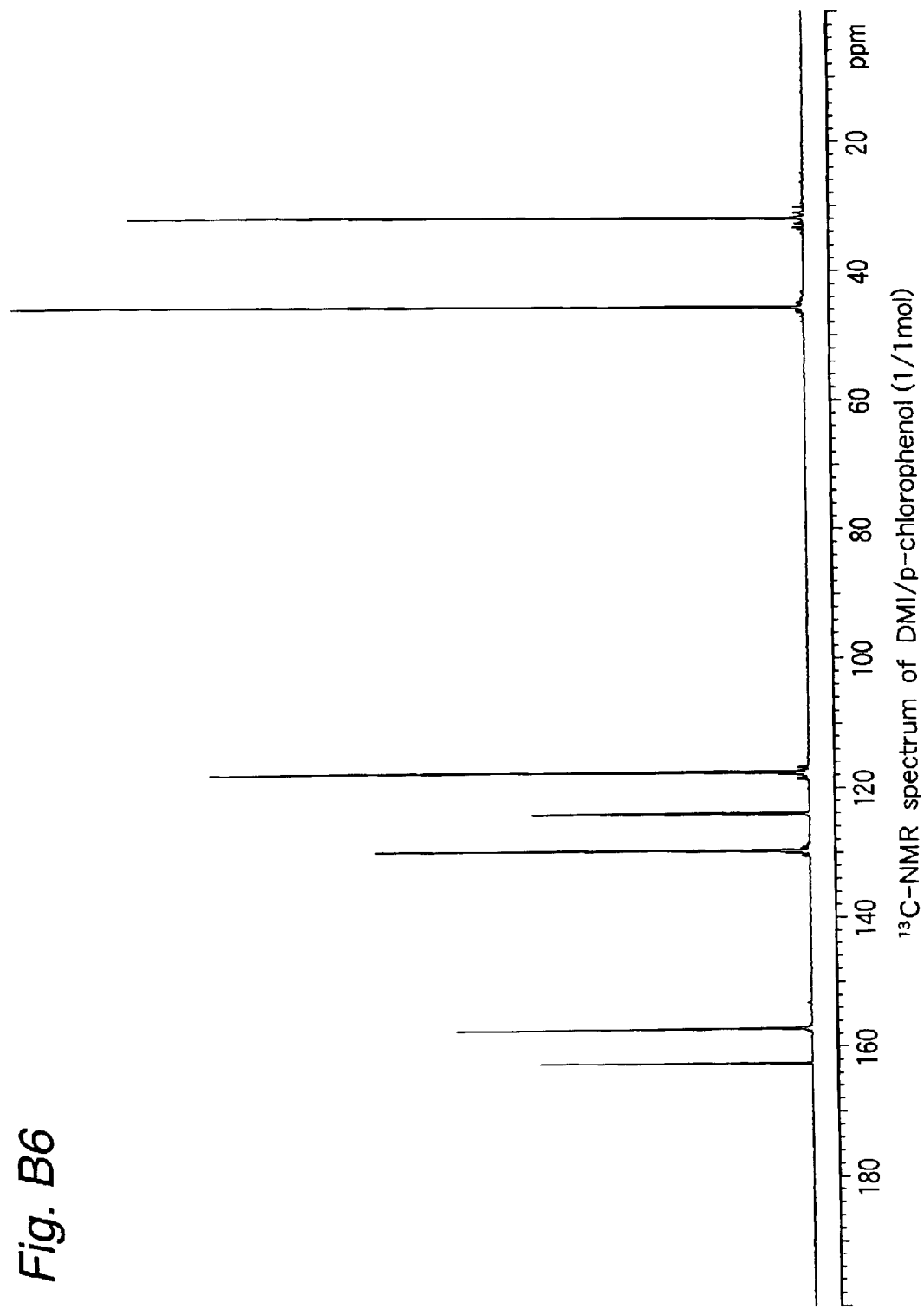

PROCESS FOR PRODUCING POLYIMIDE

TECHNICAL FIELD

The present invention relates to a process of preparing a polyimide and, more particularly, to a process for preparing a polyimide which comprises effecting an imidization reaction of a diamine and a tetracarboxylic dianhydride by use of as a solvent an equimolar composition comprising a specific nitrogen-containing cyclic compound and a specific phenol, and precipitating a polyimide and/or oligomers during the imidization reaction to thereby make the reaction system slurry.

Also, the invention relates to such an equimolar composition.

BACKGROUND ART

Conventionally, polyimides, which exhibit excellent heat resistance, mechanical properties, electrical properties, etc., have found many applications in various fields as molding materials, composite materials, electrical and electronic materials, etc. In particular, biphenyltetracarboxylic acid type polyimides, having a variety of characteristics that are different from those of pyromellitic acid type polyimides, are highly useful and thus become targets for many studies and utilization. Of these, a polyimide having the repeating structure units indicated by chemical formulas (4) to (6) below:

this reason, many processes have been developed for manufacturing polyimide powder.

For example, Japanese Patent Laid-Open Nos. 4-142332 and 2000-1545 have disclosed processes for preparing pyromellitic acid type polyimides, which are made to yield polyimides by thermally imidizing in aprotic polar solvents. Pyromellitic acid type polyimides exhibit low solubilities in solvents, and thus form and precipitate as the reaction proceeds, leading to easy yield of polyimide powder.

However, as indicated in T. Nakano, 2nd Intern. Conf. on IP, etc., biphenyltetracarboxylic acid type polyimides have high solubilities in solvents, and thus the aforementioned processes were difficult to utilize. In other words, the processes caused problems that include no precipitation of generated biphenyltetracarboxylic acid type polyimides or solidification of the reaction system because the products contain a large amount of solvents and thus swell even though the polyimides were attempted to prepare by heating in aprotic polar solvents.

For example, in G. L. Wilkes et al., Macromolecules, 30, pp. 1012 (1997), heating in N-methyl-2-pyrrolidone, an aprotic polar solvent, gives a polyimide having the repeating structure unit as indicated by chemical formula (4) above. In this case, while the polymer forms and precipitates as the reaction proceeds, the concentration of the polymer is made to be about 10% by weight during the reaction. This is due to the fact that setting of the concentration during polymerization to be equal to or higher than this concentration causes the reaction system to be in the form of clay, making it impossible to agitate because the precipitated polyimides contain a large amount of solvent and thus swell.

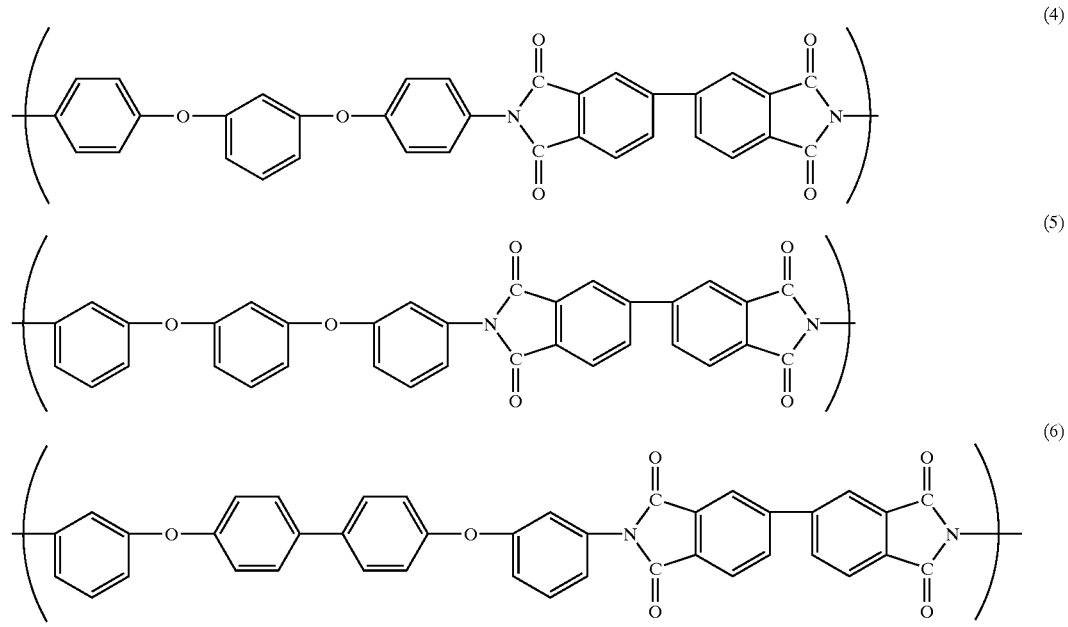

shows thermoplasticity, and therefore can provide molded products of diverse shapes by means of melt molding such as compression molding, extrusion, injection molding, and the like. As a result, utility thereof is extremely high (see G. L. Wilkes et al., Macromolecules, 30, pp. 1012 (1997); S. Tamai et al., Polymer, 37 (16) pp. 3683 (1996); S. Tamai et al., Polymer, 39 (10) pp. 1945 (1998), etc.).

Polyimide molded products are normally manufactured by sinter molding of non-thermoplastic polyimide powder or by melt molding of thermoplastic polyimide powder. For Also, in Japanese Patent Laid-Open Nos. 2000-103854 and 9-302097, etc., heating in cresol for the imidization reaction yields a polyimide having the repeating structure unit as shown in chemical formula (4) or (6) above. In this case, since the formed polymer is dissolved in the solvent, the polymer is made to precipitate using a large quantity of poor solvent after the reaction.

As discussed above, preparation of a biphenyltetracarboxylic acid type polyimide by thermally imidizing in a solvent conventionally included reaction at a low concentration or dilution with a poor solvent subsequent to reaction at a high concentration, and so the volume efficiency was extremely poor and thus the productivity was extremely low. That is, for example, the use of a reaction vessel of a capacity of 1 m³ provides less than 100 kg of an obtained polyimide, in accordance with the process of G. L. Wilkes et al., or provides less than 20 kg of a polyimide according to Japanese Patent Laid-Open No. 2000-103854.

Furthermore, conventional processes, wherein precipitated polyimides contain large amounts of solvents, require strenuous efforts for solvent removal by means of drying or the like.

In addition, Japanese Patent Laid-Open No. 6-220194 entitled "Polyimide Solution Compositions and Manufacturing Processes Thereof" describes a "process for manufacturing a polyimide wherein polycondensation is conducted in the presence of a phenolic compound in the process wherein a dianhydride is made to directly react with an aromatic diamine in an organic polar solvent to imidization reaction."

This invention is dealing with a solution of a polyimide containing aliphatic compounds that are soluble in an organic polar solvent and the object thereof is to suppress side reactions during the thermal imidization reaction in the solvent.

On the other hand, the process of preparing a polyimide of the present invention is capable of obtaining a slurry reaction solution by precipitating a polyimide during the imidization reaction, and the object thereof is to simply obtain a polyimide only by direct filtration of the reaction solution.

Therefore, the present invention is completely different from the aforementioned publications in their target and object.

Moreover, in the aforementioned publications, a phenolic compound is utilized as a catalyst for suppressing a side reaction and the amount by weight thereof is also ⅟₁₀ to ½ that of an organic polar solvent (9 to 33% by weight of the total amount of solvents), which is extremely small as compared with the present invention.

In addition, the aforementioned Japanese Patent Laid-Open No. 6-220194 does not disclose at all a process of preparing a biphenyltetracarboxylic acid type polyimide with high productivity, as will be described in the present invention, in which a nitrogen-containing cyclic compound indicated by chemical formula (1), discussed later, of organic polar solvents is strongly associated with a phenol, resulting in dissolution of the polyimide precursor (polyamide acid) and undissolution of polyimide, and an equimolar composition has an extremely high boiling temperature. For example, the publication indicates that synthesis of a polyimide, including as a solvent polar solvents of N-methyl-2-pyrrolidone and a phenol (mixing molar ratio of N-methyl-2-pyrrolidone to phenol is 65.5/34.5), is carried out at a reaction temperature of 180° C., however, it does not describe specificity concerning a boiling point, etc. for the mixed solvent of N-methyl-2-pyrrolidone and a phenol, nor does it indicate that the mixed solvent thereof exhibits a high boiling temperature and does not mix with water. Additionally, this publication does not disclose that the use of an equimolar composition having such specific properties as a solvent in a specified amount permits a biphenyltetracarboxylic acid type polyimide to precipitate during the imidization reaction.

Therefore, a process of preparing a biphenyltetracarboxylic acid type polyimide with high productivity has been demanded.

That is, the present invention has been made to solve problems associated with the prior art described above and an object of the present invention is to provide a process of preparing a polyimide by means of simple, easy, cost-effective steps without losing various properties (molding processability, sliding property, low water absorbability, electrical property, thermal oxidation stability, radiation resistance) of polyimides derived from diverse structures thereof.

DISCLOSURE OF THE INVENTION

In order to solve the aforementioned problems, the present inventors have made studies, and as a result, they have found that use of a specified composition as a reaction solvent can provide a polyimide by means of simple, easy, cost-effective steps without losing various properties (molding processability, sliding properties, low water absorbability, electrical properties, thermal oxidation stability, radiation resistance) of biphenyltetracarboxylic acid type polyimides. Based on this finding, the present invention has been completed.

Accordingly, the process of preparing a polyimide of the present invention comprises effecting an imidization reaction of a diamine and a tetracarboxylic dianhydride in a solvent containing 50 to 100% by weight of an equimolar composition of a nitrogen-containing cyclic compound indicated in chemical formula (1) below and a phenol indicated by chemical formula (2) below.

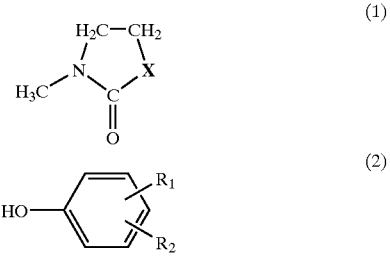

In formula (1), X represents —CH₂— or —N(CH₃)—. In formula (2), R₁ and R₂ may be the same as, or different from, each other and represent each any one of —H, —OH, —CH₃, —C₂H₇, —C₃H₇, —C₄H₉, —C₅H₁₁, —C₆H₁₃, —C₇H₁₅, —C₈H₁₇, —C₉H₁₉, —C₁₀H₂₁, —OCH₃, —O(C₆H₅), —NO₂, —Cl, —Br and —F.

The aforementioned tetracarboxylic dianhydride preferably contains a biphenyltetracarboxylic dianhydride, and this tetracarboxylic dianhydride desirably contains 30 to 100 mol % of the biphenyltetracarboxylic dianhydride based on the total amount of the tetracarboxylic dianhydride.

The polyimide obtained by the aforementioned imidization reaction preferably has the repeating structure unit indicated by chemical formula (3) below.

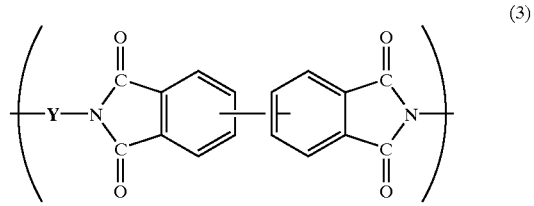

In formula (3), Y represents at least one member selected from the group consisting of formulas (e) to (h):

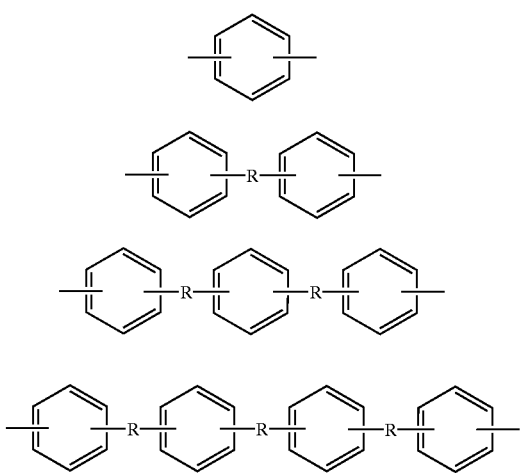

wherein R's may be the same as, or different from, each other and represent each any one of a single bond, —O—, —CO—, —SO$_2$—, —S—, —CH$_2$— and —C(CH$_3$)$_2$—.

Preferably, the total repeating structure units contain 30 to 100 mol % of the repeating structure unit indicated by chemical formula (3) above and contain 0 to 70 mol % of the balance different from the repeating structure unit indicated by chemical formula (3) above.

The balance preferably has a repeating structure unit of component units derived from an aromatic tetracarboxylic acid, different from the repeating structure unit indicated by chemical formula (3) above.

The repeating structure unit of component units derived from the aromatic tetracarboxylic acid is preferably the repeating structure units indicated by chemical formulas (a) and/or (b) below.

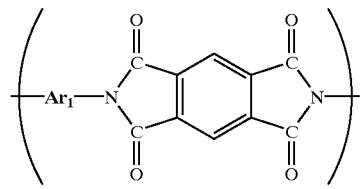

(a)

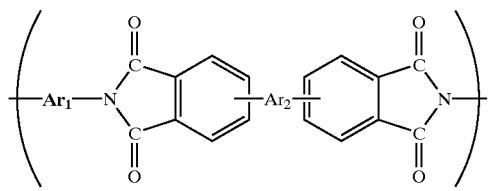

(b)

In formulas (a) and (b) above, Ar$_1$ denotes at least one member selected from the group consisting of formulas (e) to (h):

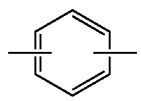

(e)

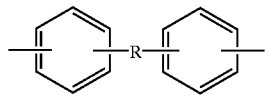

(f)

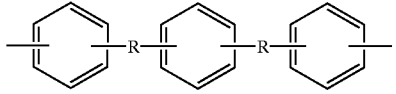

(g)

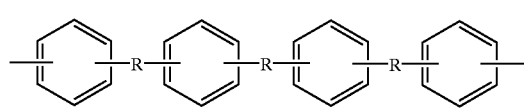

(h)

in formulas (f), (g) and (h), R's may be the same as, or different from, each other and represent each any one of a single bond, —O—, —CO—, —SO$_2$—, —S—, —CH$_2$— and —C(CH$_3$)$_2$—.

In formula (b) above, Ar$_2$ denotes at least one member selected from the group consisting of —O—, —CO—, —SO$_2$—, —S—, —CH$_2$— and —C(CH$_3$)$_2$—.

The polyimide having repeating structure unit indicated by chemical formula (3) above preferably contains at least one of the repeating structure units indicated by general formulas (4) to (6) below.

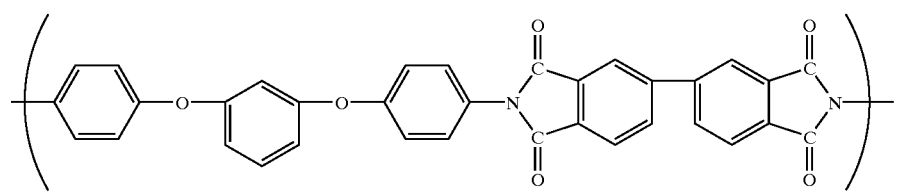

(4)

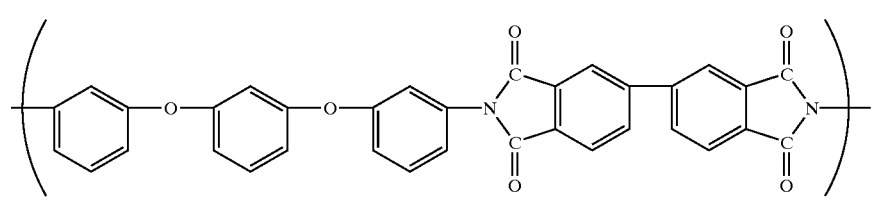

(5)

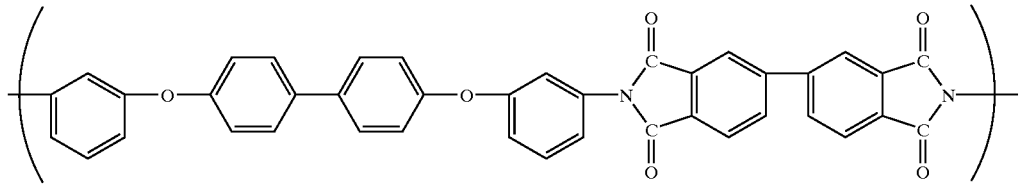

(6)

The compound indicated by chemical formula (1) above is preferably N-methyl-2-pyrrolidone and/or 1,3'-dimethyl-2-imidazolidinone.

The phenol indicated by chemical formula (2) above is preferably at least one compound selected from the group consisting of phenol, o-chlorophenol, m-chlorophenol, p-chlorophenol, o-cresol, m-cresol, p-cresol, 2,3-xylenol, 2,4-xylenol, 2,5-xylenol, 2,6-xylenol, 3,4-xylenol and 3,5-xylenol.

In a solvent containing 50 to 100% by weight of an equimolar composition of a compound indicated by chemical formula (1) above and a phenol indicated by chemical formula (2) above, the balance of the solvent preferably contains 0 to 50% by weight of a compound indicated by chemical formula (1) above or a phenol indicated by chemical formula (2) above.

The process of preparing a polyimide is capable of precipitating a polyimide and/or oligomers during the imidization reaction to make the reaction system slurry.

In the process of preparing a polyimide, the reaction is preferably conducted in the presence of an end capper.

The process of preparing a polyimide can provide a polyimide powder by precipitating a product during the imidization reaction.

The concentration of raw material monomers of diamines and tetracarboxylic dianhydrides {((total weight of raw material monomers)/(total weight of raw material monomers+weight of solvent))×100 (%)} in a reaction solution is preferably in the range of 5 to 50% by weight.

The polyimide according to the present invention is characterized by being obtained by the aforementioned process.

The polyimide powder according to the present invention is characterized by being obtained by the aforementioned process.

The solvent according to the present invention comprises an equimolar composition of a compound indicated by chemical formula (1) below and a phenol indicated by chemical formula (2) below:

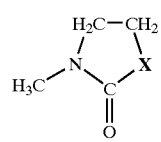

(1)

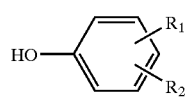

(2)

(in formula (1), X represents —$CH_2$— or —$N(CH_3)$—, and in formula (2), $R_1$ and $R_2$ may be the same as, or different from, each other and represent each any one of —H, —OH, —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$OCH_3$, —$O(C_6H_5)$, —$NO_2$, —Cl, —Br and —F.).

If the solvent contains 50 to 100% by weight of an equimolar composition of a compound indicated by chemical formula (1) above and a phenol indicated by chemical formula (2) above, it may further contain other solvents.

BRIEF DESCRIPTION OF THE DRAWINGS

FIG. A1 shows a chart of IR spectra of N-methyl-2-pyrrolidone, m-cresol and an equimolar composition thereof;

FIG. A2 shows a chart of a $^1$H-NMR spectrum of an equimolar composition of N-methyl-2-pyrrolidone and m-cresol;

FIG. A3 shows a chart of a $^{13}$C-NMR spectrum of an equimolar composition of N-methyl-2-pyrrolidone and m-cresol;

FIG. A4 shows a chart of IR spectra of N-methyl-2-pyrrolidone, p-chlorophenol and an equimolar composition thereof;

FIG. A5 shows a chart of a $^1$H-NMR spectrum of an equimolar composition of N-methyl-2-pyrrolidone and p-chlorophenol;

FIG. A6 shows a chart of a $^{13}$C-NMR spectrum of an equimolar composition of N-methyl-2-pyrrolidone and p-chlorophenol;

FIG. B1 shows a chart of IR spectra of 1,3-dimethyl-2-imidazolidinone, m-cresol and an equimolar composition thereof;

FIG. B2 shows a chart of a $^1$H-NMR spectrum of an equimolar composition of 1,3-dimethyl-2-imidazolidinone and m-cresol;

FIG. B3 shows a chart of a $^{13}$C-NMR spectrum of an equimolar composition of 1,3-dimethyl-2-imidazolidinone and m-cresol;

FIG. B4 shows a chart of IR spectra of 1,3-dimethyl-2-imidazolidinone, p-chlorophenol and an equimolar composition thereof;

FIG. B5 shows a chart of a $^1$H-NMR spectrum of an equimolar composition of 1,3-dimethyl-2-imidazolidinone and p-chlorophenol; and FIG. B6 shows a chart of a $^{13}$C-NMR spectrum of an equimolar composition of 1,3-dimethyl-2-imidazolidinone and p-chlorophenol.

BEST MODE FOR CARRYING OUT THE INVENTION

The process of preparing a polyimide of the present invention comprises effecting an imidization reaction in a solvent containing 50 to 100% by weight of an equimolar composition of a nitrogen-containing cyclic compound indicated by chemical formula (1) and a phenol indicated by chemical formula (2). In this case, the process can be preferably utilized for the preparation of a polyimide having the repeating structure unit indicated by chemical formula (3).

Specific examples of the process of preparing a polyimide of the present invention will be described hereinafter.

The process includes dissolving or dispersing a diamine, a tetracarboxylic dianhydride and an end capper in a solvent containing 50 to 100% by weight of an equimolar composition of a nitrogen-containing cyclic compound indicated by chemical formula (1) and a phenol indicated by chemical formula (2), heating the reaction system to thereby dissolve the monomers and/or the polyimide precursers (polyamide acids) in the solvent leading to a uniform reaction system, further heating the reaction system to effect an imidization reaction of the diamine, tetracarboxylic dianhydride and end capper to thereby precipitate products, polyimide and/or oligomers, in powderlike form and to make the reaction system slurry, and subsequently recovering a powderlike polyimide by filtration of the reaction solution after the completion of the reaction.

<Solvent>

The present invention relates to a process of preparing a polyimide by using, as a solvent used in the imidization reaction, a solvent containing 50 to 100% by weight of an equimolar composition of a nitrogen-containing cyclic compound indicated by chemical formula (1) and a phenol indicated by chemical formula (2).

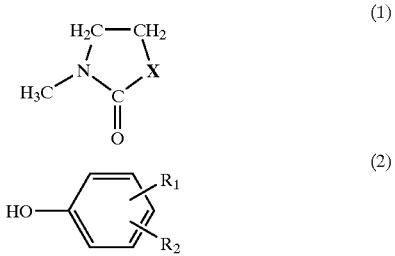

In formula (1) above, X represents —$CH_2$— or —$N(CH_3)$—. In formula (2) above, $R_1$ and $R_2$ may be the same as, or different from, each other and represent each any one of —H, —OH, —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$OCH_3$, —$O(C_6H_5)$, —$NO_2$, —Cl, —Br and —F.

<Nitrogen-containing Cyclic Compound Indicated by Chemical Formula (1)>

The nitrogen-containing cyclic compound indicated by chemical formula (1) used in the present invention is N-methyl-2-pyrrolidone and/or 1,3-dimethyl-2-imidazolidinone.

The N-methyl-2-pyrrolidone used in the present invention can be prepared by applying, as required, a conventional well-known process, and, for example, can be obtained by reacting γ-butyrolactone gained by dehydrogenation of 1,4-butanediol or water addition to maleic anhydride with a monoalkylamine such as monomethylamine. In addition, commercially available N-methyl-2-pyrrolidone (Mitsubishi Chemical Co., BASF Co., etc.) can also be used.

The 1,3-dimethyl-2-imidazolidinone used in the present invention can be prepared by applying, as required, a conventional well-known process, or commercially available one (Mitsui Chemicals Inc., etc.) can also be used.

The nitrogen-containing cyclic compound indicated by chemical formula (1) above is known as an aprotic polar solvent and has conventionally been used as a polymerization solvent for a polyimide. However, this nitrogen-containing cyclic compound has strong affinity for a polyimide and thus easily dissolves a polyimide. Thus, a conventional process of preparing a polyimide using as a solvent this nitrogen-containing cyclic compound has disadvantages in that the reaction solution becomes viscous without precipitation of a formed polyimide, requiring a large amount of poor solvent for recovery of the polyimide and the reaction system is solidified because the formed polyimide contains a large quantity of solvent to thereby precipitate in a swelled state.

In addition, the nitrogen-containing cyclic compound indicated by chemical formula (1) has strong affinity for water and therefore mixes with water without limitation. As a result, a conventional process of preparing a polyimide using as a solvent this nitrogen-containing cyclic compound can hardly remove water generated as a by-product along with the formation of a polyimide, leading to a decrease in reaction rate and target molecular weight. Therefore, a conventional process of preparing a polyimide using as a solvent this nitrogen-containing cyclic compound normally carries out reaction in the presence of an azeotropic mixture of a solvent and water to thereby eliminate water, a by-product.

<Phenols Indicated by Chemical Formula (2)>

The phenol indicated by chemical formula (2) above used in the present invention, more specifically, includes phenol, catechol, resorcinol, hydroquinone, o-ethylphenol, m-ethylphenol, p-ethylphenol, octyl phenol, o-cresol, m-cresol, p-cresol, 2,3-xylenol, 2,4-xylenol, 2,5-xylenol, 2,6-xylenol, 3,4-xylenol, 3,5-xylenol, guaiacol, nonyl phenol, o-chlorophenol, m-chlorophenol, p-chlorophenol, o-bromophenol, m-bromophenol, p-bromophenol, o-fluorophenol, m-fluorophenol, p-fluorophenol, o-phenylphenol, m-phenylphenol, p-phenylphenol, o-nitrophenol, m-nitrophenol and p-nitrophenol. These may be used singly or in a mixture of two or more species.

In addition, in the present invention, of these phenols, phenol, o-cresol, m-cresol, p-cresol, 2,3-xylenol, 2,4-xylenol, 2,5-xylenol, 2,6-xylenol, 3,4-xylenol, 3,5-xylenol, o-chlorophenol, m-chlorophenol and p-chlorophenol are preferably used and of these, use of m-cresol, p-cresol and p-chlorophenol is particularly preferable.

In the present invention, these phenols can be used singly or in combination of two or more species.

These phenols can be prepared by applying, as required, the conventional well-known processes, or commercially available one can be used.

The phenol indicated by chemical formula (2) above is known as a good solvent for a polyimide and has conventionally been utilized as a polymerization solvent for a polyimide. However, a conventional process of preparing a polyimide using as a solvent this phenol has disadvantages in that the reaction solution becomes viscous without precipitation of a formed polyimide, requiring a large amount of poor solvent for recovery of the polyimide and the reaction system is solidified because the formed polyimide contains a large quantity of solvent to thereby precipitate in a swelled state.

<Equimolar Composition of Nitrogen-containing Cyclic Compound Indicated by Chemical Formula (1) and Phenol Indicated by Chemical Formula (2)>

The equimolar composition according to the present invention is a composition prepared by blending in equimolar quantities a nitrogen-containing cyclic compound indicated by chemical formula (1) with a phenol indicated by chemical formula (2).

The equimolar composition according to the present invention, as will also be shown in examples described later, allows a carbonyl group of a nitrogen-containing cyclic compound indicated by chemical formula (1) and a hydroxyl group of a phenol indicated by chemical formula (2) to form a strong hydrogen bond and thus strong association. This may relatively weaken the affinity of a nitrogen-containing cyclic compound indicated by chemical formula (1) for a polyimide or that of a phenol indicated by chemical formula (2) for a polyimide, leading to suppression of the dissolution of a polyimide and the swelling of a polyimide due to solvent contained.

The equimolar composition according to the present invention has an extremely high boiling point as compared with those of the individual species therein and is in a liquid state at room temperature, because the nitrogen-containing cyclic compound indicated by chemical formula (1) is strongly associated with the phenol indicated by chemical formula (2).

More specifically, as will also be shown in examples later, for example, an equimolar composition of N-methyl-2-pyrrolidone (boiling point 204° C., solidifying point −23° C.) and m-cresol (boiling point 202.2° C., solidifying point 11.5° C.) has the boiling point of 230° C. and a solidifying point lower than 0° C.; an equimolar composition of N-methyl-2-pyrrolidone and p-cresol (boiling point 201.9° C., solidifying point 34.8° C.) has the boiling point of 245° C. and a solidifying point lower than 0° C. In the former example, the boiling point of the composition is higher by about 15 to 20° C. than that of N-methyl-2-pyrrolidone or those of phenols; in the latter example, the difference is as very large as about 40 to 45° C. In addition, for example, an equimolar composition of 1,3-dimethyl-2-imidazolidinone (boiling point about 225° C., solidifying point about 8° C.) and m-cresol (boiling point about 202° C., solidifying point about 12° C.) has the boiling point of 237° C. and a solidifying point lower than 0° C.; an equimolar composition of 1,3-dimethyl-2-imidazolidinone and p-chlorophenol (boiling point about 217° C., solidifying point about 43° C.) has the boiling point of 257° C. and a solidifying point lower than 0° C. In the former example, the boiling point of the composition is higher by about 12° C. than that of 1,3-dimethyl-2-imidazolidinone and higher by 35° C. than that of m-cresol. In the latter example, the boiling point of the composition is higher by about 20° C. than that of 1,3-dimethyl-2-imidazolidinone and higher by 28° C. than that of p-chlorophenol; these differences of boiling point are very large.

Thus, in the present invention, by mixing N-methyl-2-pyrrolidone and a phenol in an equimolar amount, there can be obtained a composition having an extremely increased boiling point, for example, higher by 10° C. or more, preferably higher by 20° C. or more, and more preferably higher by 25° C. or more, than that of the N-methyl-2-pyrrolidone or phenol, and also having a solidifying point of a room temperature in a liquidlike state (for example, liquid even at 5° C.). In addition, by mixing 1,3-dimethyl-2-imidazolidinone and a phenol in an equimolar amount, there can be obtained a composition having an extremely increased boiling point, for example, higher by 3° C. or more, preferably higher by 10° C. or more, more preferably higher by 20° C. or more, and most preferably higher by 30° C. or more, than that of the 1,3-dimethyl-2-imidazolidinone or phenol, and also having a solidifying point of a room temperature in a liquidlike state (for example, liquid even at 5° C.).

Additionally, the boiling point of a solvent in the present invention refers to the temperature at which the temperature of a liquid phase in a boiling solution becomes equal to that of the gas phase of the solvent vapor.

Incidentally, the boiling point of a mixed solvent with no association generally obeys Raoult's Law. Further, interaction of hydrogen bonding or the like between mixed solvent components is known to change the boiling point indicated by Raoult's Law. However, for example, the boiling point of an azeotropic composition mixture of phenol exhibiting weak acidity and aniline exhibiting weak basicity is 186.2° C., which is only slightly higher than those of phenol (181.2° C.) and aniline (184.4° C.), in contrast to an extreme boiling point rise as in the present invention. In addition, salts made from acids and bases are known to have high melting points or be nonvolatile. For example, salts formed from phenols of weak acidity and sodium hydroxide (sodium phenolates trihydrate) have melting points of 61 to 64° C. and salts formed from N-methyl-2-pyrrolidone (a) of weak basicity have melting points of 80 to 88° C., exhibiting high melting points, and thus these cannot be used as solvents. As described above, the properties of equimolar compositions according to the present invention are highly specific.

In the equimolar composition of the present invention, the nitrogen-containing cyclic compound indicated by chemical formula (1) and the phenol indicated by chemical formula (2) are strongly associated through hydrogen bonds. Therefore, the composition does not vary depending on pressure during distillation operation or the like, as distinct from general azeotropic mixtures. The equimolar composition in the present invention hardly causes changes in composition ratio even though evaporation and concentration are repeated. Accordingly, even though the equimolar composition in the present invention is recovered by distillation or the like and supplied for recycling, they always hold a constant composition and therefore do not require composition adjustment. In addition, the equimolar composition in the present invention is separated into the nitrogen-containing cyclic compound indicated by chemical formula (1) and the phenol in the presence of bases such as sodium hydroxide, and therefore the nitrogen-containing cyclic compound indicated by chemical formula (1) and phenol, i.e. the raw materials, can be recovered by distillation or the like.

The equimolar composition according to the present invention, as will also be shown in examples set forth later, is high in polarity and does not mix with water. Consequently, the raw materials for polyimide production and polyimide precursors (polyamic acids) have good solubility and the removal of water generated during dehydration is easy, and thus the composition is well suitable as a solvent for polyimide polymerization.

<Solvent Containing 50 to 100% by Weight of Equimolar Composition>

In the process of preparing a polyimide of the present invention, as a reaction solvent, a solvent containing 50 to 100% by weight of an equimolar composition of a nitrogen-containing cyclic compound indicated by chemical formula (1) above and a phenol indicated by chemical formula (2) above is used.

The solvent used in the present invention is primarily comprised of the aforementioned equimolar composition. The equimolar composition is preferably 70 to 100% by weight, more preferably 80 to 100% by weight, and most preferably 90 to 100% by weight, of the total amount of the solvent. In addition, the solvents other than the equimolar composition may be 0 to 50% by weight, preferably 0 to 30% by weight, more preferably 0 to 20% by weight, and most preferably 0 to 10% by weight, of the total amount of the solvent. Making other solvent coexist can arbitrarily change various physical properties of reaction solvents, such as melting point, boiling point, polarity, dielectric constant and solubility, used in the present invention.

Other solvents that may be contained include, for example, phenolic solvents, aprotic amide solvents, etheric solvents and amine solvents.

As phenolic solvents, the aforementioned phenols (2) can be used, which include, for example, phenol, o-chlorophenol, m-chlorophenol, p-chlorophenol, o-cresol, m-cresol, p-cresol, 2,3-xylenol, 2,4-xylenol, 2,5-xylenol, 2,6-xylenol, 3,4-xylenol and 3,5-xylenol.

Aprotic amide solvents include, for example, N,N-dimethylformamide, N,N-dimethylacetamide, N,N-diethylacetamide N-methyl-2-pyrrolidone, 1,3-dimethyl-2-imidazolidinone, N-methylcaprolactam and hexamethylphosphorotriamide.

Etheric solvents include, for example, 1,2-dimethoxyethane, bis(2-methoxyethyl) ether, 1,2-bis(2-methoxyethoxy)ethane, tetrahydrofuran, bis[2-(2-methoxyethoxy)ethyl]ether and 1,4-dioxane.

Amine solvents include, for example, pyridine, quinoline, isoquinoline, α-picoline, β-picoline, γ-picoline, isophorone, piperidine, 2,4-lutidine, 2,6-lutidine, trimethylamine, triethylamine, tripropylamine and tributylamine.

In addition, other solvents that can be used, besides the ones described above, include dimethyl sulfoxide, dimethyl sulfone, diphenyl ether, sulfolane, diphenyl sulfone, tetramethylurea, anisole, water, benzene, toluene, o-xylene, m-xylene, p-xylene, chlorobenzene, o-dichlorobenzene, m-dichlorobenzene, p-dichlorobenzene, bromobenzene, o-dibromobenzene, m-dibromobenzene, p-dibromobenzene, o-chlorotoluene, m-chlorotoluene, p-chlorotoluene, o-bromotoluene, m-bromotoluene, p-bromotoluene, acetone, methyl ethyl ketone, methyl isobutyl ketone, methanol, ethanol, propanol, isopropanol, butanol, isobutanol, pentane, hexane, heptane, cyclohexane, dichloromethane, chloroform, carbon tetrachloride, fluorobenzene, methyl acetate, ethyl acetate, butyl acetate, methyl formate and ethyl formate.

As solvents that may be included in the process of preparing a polyimide of the present invention, particularly preferred are the same solvent as the nitrogen-containing cyclic compound indicated by chemical formula (1) or the phenol indicated by chemical formula (2), which constitutes an actually used equimolar composition.

<Polyimide>

The process of preparing a polyimide of the present invention can preferably be applied to preparation of a polyimide having the repeating structure unit indicated by formula (3) below.

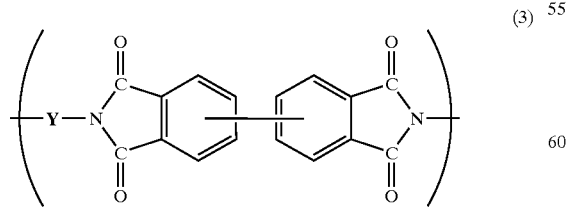

(3)

In formula (3) indicated above, Y presents at least one member selected from the group consisting of formulas (e) to (h):

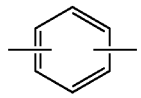

(e)

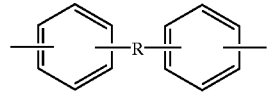

(f)

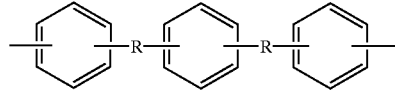

(g)

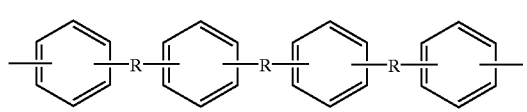

(h)

wherein R's are the same as, or different from, each other and represent each any one of a single bond, —O—, —CO—, —SO$_2$—, —S—, —CH$_2$— and —C(CH$_3$)$_2$—.

Here, the polyimide having the repeating structure unit indicated by chemical formula (3) above contains 30 to 100 mol %, preferably 50 to 100 mol %, most preferably 55 to 100 mol % of the repeating structure unit indicated by chemical formula (3) above, based on the total repeating structure units, and the balance thereof preferably has, for example, a repeating structure unit containing component units derived from aromatic tetracarboxylic acids, different from the repeating structure unit indicated by chemical formula (3) above, and desirably contains, for example, 0 to 70 mol %, preferably 0 to 50 mol %, and most preferably 0 to 45 mol % of the repeating structure units indicated by chemical formulas (a) and/or (b) below.

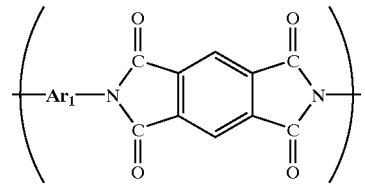

(a)

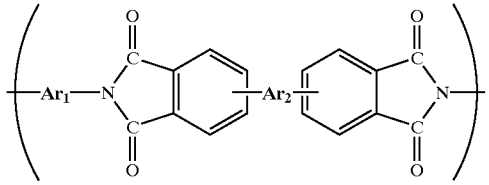

(b)

In formulas (a) and (b) indicated above, Ar$_1$ denotes at least one member selected from the group consisting of formulas (e) to (h):

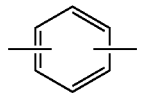

(e)

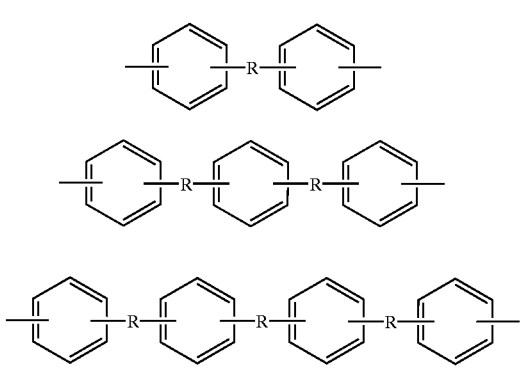

wherein R's are the same as, or different from, each other and represent each any one of a single bond, —O—, —CO—, —SO$_2$—, —S—, —CH$_2$— and —C(CH$_3$)$_2$—.

In formula (b) indicated above, Ar$_2$ denotes at least one member selected from the group consisting of —O—, —CO—, —SO$_2$—, —S—, —CH$_2$— and —C(CH$_3$)$_2$—.

In addition, the polyimide having the repeating structure unit indicated by the aforementioned general formula (3) preferable has at least one of the repeating structure units indicated by general formulas (4) to (6) below:

reaction by a conventional process, i.e., by heating in a polar solvent such as N-methyl-2-pyrrolidone or cresol, problems sometimes arise that the generated polyimide is not precipitated and the reaction system is solidified because the formed polyimide contains a large quantity of solvent to thereby precipitate in a swelled state. In addition, the polyimide composed of the repeating structure unit indicated by chemical formula (a) does not need the preparation process of the present invention because the polyimide has a low solubility in solvents and the formed polyimide precipitates when the imidization reaction by heating is carried out by the conventional process, that is, in a polar solvent such as N-methyl-2-pyrrolidone or cresol. Moreover, the polyimide composed of the repeating structure unit indicated by chemical formula (b) is very soluble in solvents, and so problems sometimes arise that the generated polyimide is not precipitated and the reaction system is solidified because the formed polyimide contains a large quantity of solvent to thereby precipitate in a swelled state, even though the preparation process of the present invention is used.

The polyimide prepared by the preparation process of the present invention may be encapped at the terminals thereof by an end capper such as phthalic anhydride, aniline, maleic anhydride, or phenylethynylphthalic anhydride. Additionally, the polyimide may have branches in the structure of the main chain, side chains or terminals, and may also have structure for crosslinkage, ring structure or the like.

The degree of polymerization of a polyimide prepared by a preparation process of the present invention is not limited

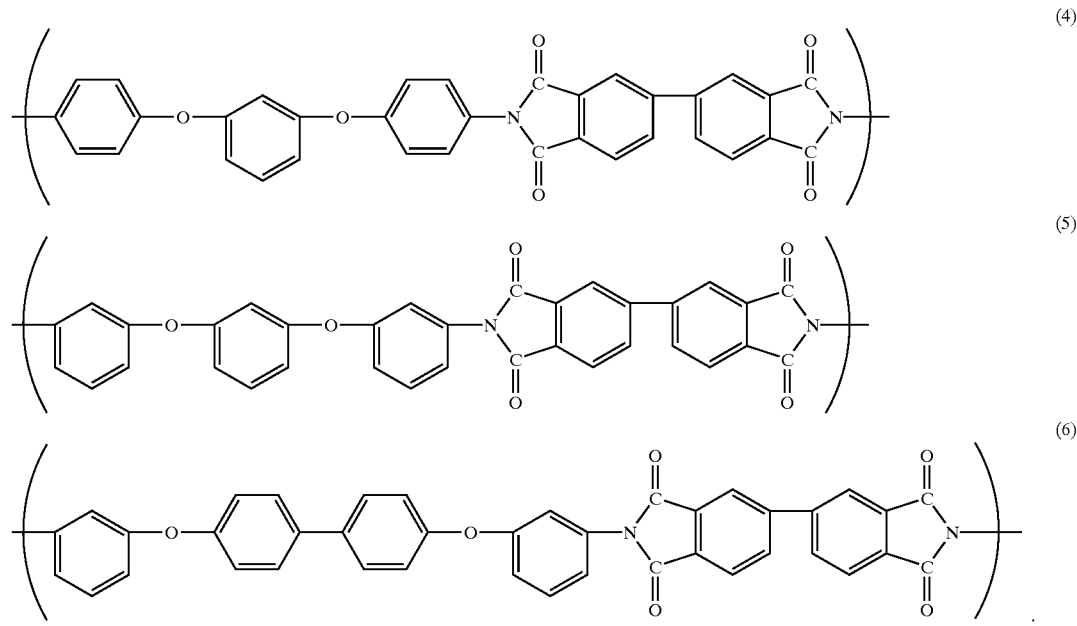

Further, it is preferred that the repeating structure unit constituting the aforementioned balance does not contain component units derived from aliphatic tetracarboxylic acids containing aromatic rings and tetracarboxylic acids containing fluorine.

As described in T. Nakano, 2nd Intern. Conf. on PI, etc., biphenyltetracarboxylic acid type polyimides composed of the repeating structure unit indicated by chemical formula (3) above are highly soluble in solvents. Therefore, when a polyimide containing 30 to 100 mol % of the repeating structure unit indicated by chemical formula (3) above of the total repeating structure units is subjected to the imidization and is arbitrarily selected dependent on applications of a polyimide. In the conventional process of preparing a polyimide, the formed polyimide does not precipitate, that is, when the formed polyimide is dissolved in solvent, the reaction solution becomes viscous and therefore the polymerization degree of a prepared polyimide is restricted. On the other hand, in the process of preparing a polyimide of the present invention, the formed polyimide precipitates and the reaction solution becomes a slurry, and so the reaction solution does not become viscous and thus allows agitation even when producing a high-molecular polyimide.

<Diamine>

In the process of preparing a polyimide of the present invention, a conventionally well-known aromatic diamine can preferably be used. Additionally, when aliphatic diamines, siloxane diamines or fluorine-containing diamines are used, the obtained polyimide dissolves in the solvents used in the present invention, so that the aimed effects of the present invention cannot be obtained in some cases.

More specifically, (1) Diamines having one benzene ring include, for example, p-phenylenediamine and m-phenylenediamine.

(2) Diamines having two benzene rings include, for example, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diaminobenzophenone, 4,4'-diaminobenzophenone, 3,4'-diaminobenzophenone, 3,3'-diaminodiphenylmethane, 4,4'-diaminodiphenylmethane, 3,4'-diaminodiphenylmethane, 2,2-di(3-aminophenyl)propane, 2,2-di(4-aminophenyl)propane, 2-(3-aminophenyl)-2-(4-aminophenyl)propane, 1,1-di(3-aminophenyl)-1-phenylethane, 1,1-di(4-aminophenyl)-1-phenylethane, and 1-(3-aminophenyl)-1-(4-aminophenyl)-1-phenylethane.

(3) Diamines having three benzene rings include, for example, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(3-aminobenzoyl)benzene, 1,3-bis(4-aminobenzoyl)benzene, 1,4-bis(3-aminobenzoyl)benzene, 1,4-bis(4-aminobenzoyl)benzene, 1,3-bis(3-amino-α,α-dimethylbenzyl)benzene, 1,3-bis(4-amino-α,α-dimethylbenzyl)benzene, 1,4-bis(3-amino-α,α-dimethylbenzyl)benzene, 1,4-bis(4-amino-α,α-dimethylbenzyl)benzene, 2,6-bis(3-aminophenoxy)benzonitrile, and 2,6-bis(3-aminophenoxy)pyridine.

(4) Diamines having four benzene rings include, for example, 4,4'-bis(3-aminophenoxy)biphenyl, 4,4'-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis[4-(3-aminophenoxy)phenyl]sulfone, bis[4-(4-aminophenoxy)phenyl]sulfone, bis[4-(3-aminophenoxy)phenyl]ether, bis[4-(4-aminophenoxy)phenyl]ether, 2,2-bis[4-(3-aminophenoxy)phenyl]propane, and 2,2-bis[4-(4-aminophenoxy)phenyl]propane.

(5) Diamines having five benzene rings include, for example, 1,3-bis[4-(3-aminophenoxy)benzoyl]benzene, 1,3-bis[4-(4-aminophenoxy)benzoyl]benzene, 1,4-bis[4-(3-aminophenoxy)benzoyl]benzene, 1,4-bis[4-(4-aminophenoxy)benzoyl]benzene, 1,3-bis[4-(3-aminophenoxy)-α,α-dimethylbenzyl]benzene, 1,3-bis[4-(4-aminophenoxy)-α,α-dimethylbenzyl]benzene, 1,4-bis[4-(3-aminophenoxy)-α,α-dimethylbenzyl]benzene, and 1,4-bis[4-(4-aminophenoxy)-α,α-dimethylbenzyl]benzene.

(6) Diamines having six benzene rings include, for example, 4,4'-bis[4-(4-aminophenoxy)benzoyl]diphenyl ether, 4,4'-bis[4-(4-amino-α,α-dimethylbenzyl)phenoxy]benzophenone, 4,4'-bis[4-(4-amino-α,α-dimethylbenzyl)phenoxy]diphenylsulfone, and 4,4'-bis[4-(4-aminophenoxy)phenoxy]diphenylsulfone.

(7) Diamines having other aromatic substituents include, for example, 3,3'-diamino-4,4'-diphenoxybenzophenone, 3,3'-diamino-4,4'-dibiphenoxybenzophenone, 3,3'-diamino-4-phenoxybenzophenone, and 3,3'-diamino-4-biphenoxybenzophenone.

In the present invention, there can also, as necessary, be used diamines wherein part or all of the hydrogen atoms on the aromatic rings of diamines having aromatic rings are replaced with substituents such as a methyl group, a methoxy group, an ethynyl group to be a crosslinking point, a benzocyclobutene-4'-yl group, a vinyl group, an allyl group, a cyano group, an isocyanate group, a nitrilo group, and an isopropenyl group.

Further, there can also, as necessary, be used diamines having in their main skeleton chain substituents such as a vinylene group, a vinylidene group and an ethynylidene group, to be crosslinking points.

Additionally, there can also be used triamines and tetraamines instead of diamines in order to incorporate branches.

These diamines can be used singly or in combination of two or more species.

<Tetracarboxylic Dianhydride>

In the process of preparing a polyimide of the present invention, biphenyltetracarboxylic dianhydrides are preferably used as tetracarboxylic dianhydrides. These biphenyltetracarboxylic dianhydrides, more particularly, include 3,3',4,4'-biphenyltetracarboxylic dianhydrides, 2,3',3,4'-biphenyltetracarboxylic dianhydrides and 2,2',3,3'-biphenyltetracarboxylic dianhydrides. These biphenyltetracarboxylic dianhydrides can be used singly or in combination of two or more species. Of these, 3,3',4,4'-biphenyltetracarboxylic dianhydrides are preferable as tetracarboxylic dianhydrides in the present invention.

In the present invention, biphenyltetracarboxylic dianhydrides are preferably used as tetracarboxylic dianhydrides and other conventionally well-known tetracarboxylic dianhydrides can be used together with the biphenyltetracarboxylic dianhydrides. As these other tetracarboxylic dianhydrides, aromatic tetracarboxylic dianhydrides are preferably used. In addition, when aliphatic tetracarboxylic acids free of aromatic rings and tetracarboxylic acids containing fluorine are used, aimed effects of the present invention cannot be obtained in some cases since polyimides thus obtained dissolve in solvents used in the present invention. These aliphatic tetracarboxylic acids free of aromatic rings include, for example, bicyclo(2,2,2)-octo-7-ene-2,3,5,6-tetracarboxylic dianhydrides, ethylenetetracarboxylic dianhydrides, butanetetracarboxylic dianhydrides, and cyclopentanetetracarboxylic dianhydrides.

Therefore it is not preferable for the present invention to use as other tetracarboxylic acids aliphatic tetracarboxylic acids free of aromatic rings or tetracarboxylic acids containing fluorine.

Other aromatic tetracarboxylic dianhydrides to be used together with the aforementioned biphenyltetracarboxylic dianhydrides in the present invention include, for example, pyromellitic dianhydride, bis(3,4-dicarboxyphenyl)ether dianhydride, bis(3,4-dicarboxyphenyl)sulfide dianhydride, bis(3,4-dicarboxyphenyl)sulfone dianhydride, 2,2-bis(3,4-dicarboxyphenyl)propane dianhydride, 1,3-bis(3,4-dicarboxyphenoxy)benzene dianhydride, 1,4-bis(3,4-dicarboxyphenoxy)benzene dianhydride, 4,4'-bis(3,4-dicarboxyphenoxy)biphenyl dianhydride, 2,2-bis[(3,4-dicarboxyphenoxy)phenyl]propane dianhydride, 2,3,6,7-naphthalenetetracarboxylic dianhydride, 1,4,5,8-naphthalenetetracarboxylic dianhydride, 2,2',3,3'-benzophenonetetracarboxylic dianhydride, 2,3',3,4'-benzophenonetetracarboxylic dianhydride, 2,2-bis(2,3- dicarboxyphenyl)propane dianhydride, bis(2,3-dicarboxyphenyl)ether dianhydride, bis(2,3-dicarboxyphenyl)sulfide dianhydride, bis(2,3-dicarboxyphenyl)sulfone dianhydride, 1,3-bis(2,3-dicarboxyphenoxy)benzene dianhydride, 1,4-bis(2,3-dicarboxyphenoxy)benzene dianhydride, and 1,2,5,6-naphthalenetetracarboxylic dianhydride.

These other aromatic tetracarboxylic dianhydrides can be used singly or in combination of two or more species.

In the present invention, there can also, as necessary, be used tetracarboxylic dianhydrides wherein part or all of the hydrogen atoms on the aromatic rings of aromatic tetracarboxylic dianhydrides are replaced with substituents such as a methyl group, a methoxy group, an ethynyl group to be a crosslinking point, a benzocyclobutene-4'-yl group, a vinyl group, an allyl group, a cyano group, an isocyanate group, a nitrilo group, and an isopropenyl group.

Further, there can also be used tetracarboxylic dianhydrides having in their main skeleton chain substituents such as a vinylene group, a vinylidene group and an ethynylidene group, to be crosslinking points.

Additionally, there can also be used hexacarboxylic trianhydrides and octacarboxylic tetraanhydrides instead of tetracarboxylic dianhydrides in order to incorporate branches.

These tetracarboxylic dianhydrides can be used singly or in combination of two or more species.

For the amount of tetracarboxylic dianhydride used in the present invention, the amount of biphenyltetracarboxylic dianhydride is preferably 30 to 100 mol %, more preferably 50 to 100 mol %, and most preferably 55 to 100 mol %, based on the total amount of tetracarboxylic dianhydride, and the amount of other tetracarboxylic dianhydrides is preferably 0 to 70 mol %, more preferably 0 to 50 mol %, and most preferably 0 to 45 mol %, based on the total amount of tetracarboxylic dianhydride.

When the amount of the other tetracarboxylic dianhydrides to be used exceeds 70 mol %, a polyimide to be obtained is excessively soluble in the solvent, which sometimes creates problems that the generated polyimide is not precipitated and the reaction system is solidified because the formed polyimide contains a large quantity of solvent to thereby precipitate in a swelled state, even though the preparation process of the present invention is utilized. In addition, when more than 70 mol % of a pyromellitic dianhydride is, for example, used as another tetracarboxylic dianhydride, the preparation process of the present invention is not required since a polyimide to be obtained has a low solubility in the solvent.

In other words, the formed polyimide precipitates even in a conventional process in which the thermal imidization reaction is carried out in a polar solvent such as N-methyl-2-pyrrolidone or cresol.

<Amounts of Diamines and Tetracarboxylic Dianhydrides>

The amount of tetracarboxylic dianhydrides to be used in the present invention (sum of the amount of biphenyltetracarboxylic dianhydrides and the amount of other tetracarboxylic dianhydrides) is not particularly limited, however, they are normally used preferably in an amount of 0.8 to 1.25 mol per mol of diamine(s) to be used. Changing the molar ratio of tetracarboxylic dianhydrides to diamines, to be used, can control the molecular weights of polyimides to be obtained.

When this molar ratio (tetracarboxylic dianhydride/diamine) is less than 0.8, the molecular weight of a polyimide sufficiently exhibiting various properties cannot be obtained, and on the other hand, when the molar ratio exceeds 1.25, the molecular weight of a polyimide sometimes decreases.

In addition, when a monoamine is used as an end capper, as will be set forth later, the amount of a tetracarboxylic dianhydride to be used is preferably in the range of 1.01 to 1.25 mols, more preferably 1.05 to 1.20 mols, and most preferably 1.07 to 1.15 mols, per total one mol of diamine(s) to be used. In this case, when the molar ratio (tetracarboxylic dianhydride/diamine) is less than 1.01 or exceeds 1.25, endcapping (termination) becomes insufficient, which sometimes inversely affects the thermal stability and processability of a polyimide obtained.

Furthermore, when a dicarboxylic acid or an anhydride or a derivative thereof described later is used as an end capper, the amount of a tetracarboxylic dianhydride to be used is preferably 0.8 to 0.99 mol, more preferably 0.85 to 0.97 mol and most preferably 0.90 to 0.95 mol, per total one mol of diamine(s) to be used. In this case, when the molar ratio (tetracarboxylic dianhydride/diamine) is less than 0.8 or exceeds 0.99, endcapping becomes insufficient, which sometimes inversely affects the thermal stability and processability of a polyimide obtained.

The molecular weight of a polyimide can be controlled by changing the molar ratio of a diamine and a tetracarboxylic dianhydride, which are used in preparing a polyimide, and the optimal charging ratio thereof varies in some cases depending on the purities and amounts of impurities of raw materials, polymerization processes, kinds of solvents, polymerization temperature and polymerization duration, etc.

Additionally, the total mols of the diamine(s) to be used and the total mols of the tetracarboxylic dianhydride(s) to be used should be almost the same to obtain a sufficiently high molecular weight polyimide. In this case, use of a conventional process, wherein the formed polyimide does not precipitate, leads to a very high viscosity of the reaction solution and thus difficulty in agitation. However, according to the preparation process of the present invention, the formed polyimide precipitates, making the reaction system slurry, so that the reaction solution does not become viscous, not preventing agitation.

<End Capper>

In the process of preparing a polyimide of the present invention, an end capper can be used, as needed. The end capper to be used is not particularly limited and various kinds thereof can be used. Of these, monoamines, dicarboxylic anhydrides, or the like can preferably be used.

Monoamines to be used as these end cappers include, for example, aniline, o-toluidine, m-toluidine, p-toluidine, 2,3-xylidine, 2,4-xylidine, 2,5-xylidine, 2,6-xylidine, 3,4-xylidine, 3,5-xylidine, o-chloroaniline, m-chloroaniline, p-chloroaniline, o-bromoaniline, m-bromoaniline, p-bromoaniline, o-nitroaniline, m-nitroaniline, p-nitroaniline, o-anisidine, m-anisidine, p-anisidine, o-phenetidine, m-phenetidine, p-phenetidine, o-aminophenol, m-aminophenol, p-aminophenol, o-aminobenzaldehyde, m-aminobenzaldehyde, p-aminobenzaldehyde, o-aminobenzonitrile, m-aminobenzonitrile, p-aminobenzonitrile, 2-aminobiphenyl, 3-aminobiphenyl, 4-aminobiphenyl, 2-aminophenylphenyl ether, 3-aminophenylphenyl ether, 4-aminophenylphenyl ether, 2-aminobenzophenone, 3-aminobenzophenone, 4-aminobenzophenone, 2-aminophenylphenyl sulfide, 3-aminophenylphenyl sulfide, 4-aminophenylphenyl sulfide, 2-aminophenylphenyl sulfone, 3-aminophenylphenyl sulfone, 4-aminophenylphenyl sulfone, α-naphthylamine, β-naphthylamine, 1-amino-2-naphthol, 2-amino-1-naphthol, 4-amino-1-naphthol, 5-amino-1-naphthol, 5-amino-2-naphthol, 7-amino-2-naphthol, 8-amino-1-naphthol, 8-amino-2-naphthol, 1-aminoanthracene, 2-aminoanthracene, 9-aminoanthracene, methylamine, dimethylamine, ethylamine, diethylamine, propylamine, dipropylamine, isopropylamine, diisopropylamine, butylamine, dibutylamine, isobutylamine, diisobutylamine, penthylamine, dipenthylamine, benzylamine, cyclopropylamine, cyclobutylamine, cyclopenthylamine, and cyclohexyl amine.

In addition, dicarboxylic anhydrides used as these end cappers include, for example, phthalic anhydride, 2,3-benzophenonedicarboxylic anhydride, 3,4-benzophenonedicarboxylic anhydride, 2,3-dicarboxyphenylphenyl ether anhydride, 3,4-dicarboxyphenylphenyl ether anhydride, 2,3-biphenyldicarboxylic anhydride, 3,4-biphenyldicarboxylic anhydride, 2,3-dicarboxyphenylphenyl sulfone anhydride, 3,4-dicarboxyphenylphenyl sulfone anhydride, 2,3-dicarboxyphenylphenyl sulfide anhydride, 3,4-dicarboxyphenylphenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride, and 1,9-anthracenedicarboxylic anhydride.

In these monoamines and dicarboxylic anhydrides, parts of the structures thereof may be replaced by groups having no reactivity with amines and carboxylic anhydrides.

There can also be sued a monoamine or a dicarboxylic anhydride wherein part of the structure thereof is replaced by a substituent such as an ethynyl group, a benzocyclobutene-4'-yl group, a vinyl group, an allyl group, a cyano group, an isocyanate group, a nitrilo group, and an isopropenyl group, a vinylene group, a vinylidene group or ethynylidene group, which becomes crosslinking points.

These end cappers can be used singly or in combination of two or more species.

The amount of the end cappers to be used is not particularly limited, however, preferably, the relation $100 \geq ([Dc]-[Ma])/([Da]-[Tc]) \geq 2$ holds, and more preferably, the relation $20 \geq ([Dc]-[Ma])/([Da]-[Tc]) \geq 3$ holds, wherein

[Da] (mol) is the total amount of diamine components,

[Tc] (mol) is the total amount of tetracarboxylic dianhydride components (or including the ring-opened products and derivatives thereof),

[Ma] (mol) is the total amount of monoamine components used as end cappers, and

[Dc] (mol) is the total amount of dicarboxylic anhydride components (or including the ring-opened products and derivatives thereof) used as end cappers.

When the value of $([Dc]-[Ma])/([Da]-[Tc])$ is less than 2, a sufficient termination of molecule ends cannot be obtained, which in turn decreases the thermal stability, thermal oxidation stability and mold processability of an obtained polyimide in some cases. When the value of $([Dc]-[Ma])/([Da]-[Tc])$ exceeds 100, the control of the molecular weight of an obtained polyimide and the cleaning of excessive end cappers are sometimes difficult.

In addition, in the preparation process of the present invention, the end capper is preferably charged at the starting time of the reaction together with an aromatic diamine and an aromatic tetracarboxylic dianhydride. Since the formed polymer precipitates as the reaction proceeds in the preparation process of the present invention, sufficient termination may not occur when the end capper is added afterward.

<Catalyst>

In the process of preparing a polyimide of the present invention, when the reaction of a diamine and a tetracarboxylic dianhydride is carried out, a well-known catalyst can be utilized in combination with these. A basic catalyst is preferably used when a catalyst is used.

The basic catalyst includes amine-based compounds such as pyridine, quinoline, isoquinoline, α-picoline, β-picoline, γ-picoline, isophorone, piperidine, 2,4-lutidine, 2,6-lutidine, trimethylamine, triethylamine, tripropylamine, tributylamine, organic bases such as imidazole, N,N-dimethylaniline and N,N-diethylaniline, and inorganic bases such as potassium hydroxide, sodium hydroxide, potassium carbonate, sodium carbonate, potassium bicarbonate and sodium bicarbonate.

The amount of the catalyst to be used is preferably 0.001 to 0.50 mol, and more preferably 0.05 to 0.2 mol, per total one mol of diamine(s) to be used.

<Preparation of Polyimide>

The process of preparing a polyimide of the present invention is not particularly limited, as long as a solvent containing 50 to 100% by weight of an equimolar composition of a nitrogen-containing cyclic compound indicated by chemical formula (1) above and a phenol indicated by chemical formula (2) is used. However, preferably, the diamine of a raw material monomer and the tetracarboxylic dianhydride are kept dissolved in the solvent or suspended and are heated to effect an imidization by thermal dehydration. In this case, the order and timing of charging of a diamine, a tetracarboxylic dianhydride and an end capper can be arbitrarily chosen.

The concentrations of the raw material monomers to be used in the present invention are not particularly limited, and the structure and molecular weight of a polyimide to be obtained can be arbitrarily set by conditions such as reaction temperature and temperature during filtration. The preparation process according to the present invention permits a slurry polymerization at high concentrations as compared with the process by polyimide preparation in a well-known phenol-based single solvent.

In order to make the most of these characteristics concerning the present invention, the concentration of raw material monomers is preferably 5 to 50% by weight, more preferably 10 to 45% by weight, still more preferably 18 to 40% by weight, and most preferably 23 to 37% by weight, based on the total amount of the reaction solution.

When the concentration of raw material monomers is less than 5% by weight, a yield per batch diminishes and thus production efficiency decreases, resulting in a loss of characteristics of the present invention. On the other hand, when the concentration exceeds 50% by weight, stable production may be prevented due to difficulty in agitation of a reaction solution in the imidization reaction step.

In addition, the aforementioned concentration refers to a concentration indicated by ((total weight of raw material monomers)/(total weight of raw material monomers)+ (weight of solvents))×100 (%).

To polymerization temperature, polymerization duration and polymerization pressure are applied well-known conditions without particular limitation. In other words, the reaction temperature is preferably about 80° C. to about 400° C., and more preferably about 100° C. to about 300° C. In addition, the upper limit of the reaction temperature is restricted by the boiling point of solvent at a pressure during polymerization. Further, the reaction time is normally preferably 0.5 to 24 hours, depending on solvents to be used and other reaction conditions.

Moreover, according to the preparation process of the present invention, the solvent used for the reaction has a high boiling point, and so, for example, even in a temperature over 200° C. polymerization can be effectively carried out. Accordingly, the reaction is conducted at a normal pressure and eliminates the need for a special apparatus for decreasing or increasing the pressure of the reaction system, and therefore the process can be simplified.

Additionally, the aforementioned polymerization can be carried out in any atmosphere of air, nitrogen, helium, neon and argon, and the atmosphere during reaction is not particularly limited. However, nitrogen or argon of an inert gas is preferably used.

The concentration of the polyimide thus obtained is preferably 5 to 50% by weight, more preferably 10 to 45% by weight, still more preferably 18 to 40% by weight, and most preferably 23 to 37% by weight, based on the total amount of the reaction solution.

In addition, the concentration used herein refers to a concentration indicated by ((weight of polyimide)/(weight of polyimide)+(weight of solvents))×100(%).

<State of Reaction Solution in Polymerization Step>

In the process of preparing a polyimide of the present invention, by using a solvent containing 50 to 100% by weight of an equimolar composition of a nitrogen-containing cyclic compound indicated by chemical formula (1) above and a phenol indicated by chemical formula (2) above as a solvent, the state of the reaction solution in the final stage of the imidization reaction in the polyimide preparation step can be made to be a slurry state wherein a polyimide precipitates in the solvent, even at normal pressure and under conditions within the aforementioned reaction temperature range. A typical reaction status includes an example wherein a monomer and/or a polyimide precursor dissolve at early stages of the reaction and the reaction solution once becomes a homogeneous solution and then a polyimide precipitates as the reaction proceeds, allowing the reaction solution to become slurry. Additionally, the "final phase" of reaction used in this specification refers to a stage wherein a reaction progresses as described previously and polymerization of a polyimide and polyimide yielding are almost completed.

Further, even though this slurry reaction solution is cooled to approximately room temperature, the reaction solution does not become viscous, but keeps a slurry state.

<Recovery of Polyimide>

In the present invention, a polyimide can be obtained simply by directly filtering the thus obtained slurry reaction solution. In addition, to ensure the precipitation of a polyimide, a poor solvent such as toluene, methanol, ethanol, methyl ethyl ketone, water or N-methyl-2-pyrrolidone can be charged, as necessary.

In the process of preparing a polyimide of the present invention, the polyimide obtained by such an operation is normally powderlike, and therefore the solvent can easily be removed and the product can be easily used for a variety of applications. Moreover, the solvent in the recovered polyimide can be removed in well-known various ways. For example, the solvent can be removed by drying in an oven at 100 to 400° C.

Normally in the production of a polyimide, polymerization is carried out in many cases by causing the concentration of raw materials to be low to some extent (for example, about 10% by weight) to thereby prevent the solidification or the like of a formed polymer, although it varies with the structure of a formed polyimide. However, use of a mixed solvent of a high boiling point relating to the present invention can obtain the reaction solution in a slurry state without solidification of the reaction solution although the total concentration of the raw materials for a polyimide is made to be higher (for example, 20% by weight or more) for imidization, and thus the productivity of a polyimide in an industrial process can be improved. Moreover, the thus obtained polyimide also shows physical properties equivalent to those of a polyimide obtained by a conventional low concentration polymerization (e.g. about 10% by weight). That is, no physical properties such as molding processability, sliding properties, low water absorbability, electrical properties, thermal oxidation stability and radiation resistance deteriorate.

The polyimide obtained by the process of preparing a polyimide of the present invention has physical properties equivalent to those of a polyimide obtained by a conventional process. Therefore, the polyimide can be applied to a conventionally well-known process, including compression molding, sinter molding, extrusion, injection molding, or transfer molding, and can be supplied to conventionally known applications.

Industrial Applicability

The polyimides obtained by the process of the present invention can be used in variety of applications; for example, trays for IC package, trays for the IC manufacturing step, IC sockets, and wafer carriers in the semiconductor package area; connectors, sockets and bobbins as well as manufacturing jigs such as hard disk carriers, liquid crystal display carriers and trays for quartz oscillator production in the electrical and electronic parts area; separation claws for copiers, adiabatic bearings for copiers, and gears for copiers in the office equipment parts area; thrust washers, transmission rings, piston rings, and oil seal rings in the automobile parts area; bearing retainers, pump gears, conveyer chains, and sliding bushes for stretching machines in the industrial equipment parts area; and films and fibers in other areas.

In addition, the aforementioned equimolar composition or the solvent containing a specified amount of an equimolar composition, according to the present invention, has a high boiling point and a low solidifying point, and has an appropriate polarity (e.g. dielectric constant of 20 (almost equal to that of acetone) to 33 (almost the same as that of methanol)), and also has a specific characteristic of not mixing with water, and therefore it can be simply and easily utilized as organic solvents under normal reaction conditions and even under high-temperature reaction conditions. Their applications include, for example, reaction solvents for diverse organic and inorganic reactions, solvents for polyimide synthesis during production of polymers such as a polyimide, solvents for extraction and refining of various chemical substances, solvents for ink and paints dissolving dyes, pigments, etc., cleaning agents, coolants and heating media, solvents for paints and adhesives dissolving polymers and polymer plasticizers. Of these, production of a polyimide, for example, is sometimes carried out under high-temperature conditions such as at a polymerization temperature of 200° C. or higher at normal pressure, and therefore the equimolar composition or solvents containing a specified amount of the equimolar composition, concerning the present invention, are particularly useful as organic solvents for polyimide synthesis.

Further, the equimolar composition or the solvent containing a specified amount of the equimolar composition, relating to the present invention, has a high boiling point, and thus permits shortening of reaction time because the reaction temperature can be increased, when they are used as solvents for polymerization or reaction.

Moreover, when the equimolar composition or the solvent containing a specified amount of the equimolar composition, relating to the present invention, is used as a refining solvent, the refining yield of a target product can be improved in crystallizing operation of conducting dissolution at high temperature and crystallization at low temperature, because a large solubility difference is obtained by enlarging the temperature difference between the high temperature and the low temperature.

Effects of the Invention

The process of preparing a polyimide of the present invention can provide a slurry reaction solution having a precipitate of a polyimide and provide a polyimide simply by direct filtration of this reaction solution, and therefore can give a polyimide in an easy and inexpensive way. Moreover, the preparation process of the present invention allows the reaction solution to be slurry without solidification even though the polymerization is conducted by making high the concentration of raw materials for polyimide production, and can thus improve the productivity of a polyimide and does not worsen the various physical properties of a polyimide (molding processability, sliding property, low water absorbability, electrical property, thermal oxidation stability, radiation resistance) derived from diverse structures.

EXAMPLES

The present invention will be described in more detail with reference to the following Examples. However, the prevent invention is by no means limited to these Examples.

In addition, methods for testing various samples common to Examples and Comparative Examples will be described in the following.
1) IR Spectra of Equimolar Compositions
Measurement was made by a liquid film method using a Bio-Rad FTS-165.
2) NMR Spectra of Equimolar Compositions
Liquid compositions were directly measured using a Varian Unity Inova400.
3) Relative Dielectric Constant ($\in'$) and Dielectric Loss Tangent (tan $\delta$) of Equimolar Compositions
Measurement was made by an LCR meter bridge method using a precise LCR meter HP4284A (Agilent Technologies, Inc.) and an Electrode LE-22 for measurement (Ando Electric Co., Ltd.). The measurement frequency is 1 MHz and measurement conditions are 22±1° C./60±2% RH.
4) Inherent Viscosity of Polyimide Powder
Measurement was made at 35° C. after 0.50 g of a sample was heat dissolved in 100 ml of a mixed solvent of p-chlorophenol and phenol (ratio by weight of 90:10).
5) Melt Viscosity
Measurement was made by a Shimadzu Koka Type Flow Tester (CFT 500A) for an orifice 1.0 mm (diameter)×10 mm (length), load 100 kgf, and, unless otherwise specified, retention time 5 min.
6) 5% By-weight Decrease Temperature
Measurement was made in air using a DTA-TG (Shimadzu DT-40 Series, 40M) at a rate of temperature rise of 10° C./min.
7) Glass Transition Temperature and Crystal Melt Temperature (Melting Point)
Measurement was made using a DSC (Shimadzu DT-40 Series, DSC-41M) at a rate of temperature rise of 10° C./min.

Example A1

Refined N-methyl-2-pyrrolidone having a boiling point of 204.5° C. and a water content of 10 ppm or less was prepared by charging N-methyl-2-pyrrolidone into a flask equipped with a sufficiently dried packed column and distilling it in a nitrogen atmosphere at normal pressure. In addition, m-cresol (reagent grade) was similarly distilled to give refined m-cresol having a boiling point of 202.2° C. and a water content of 10 ppm or less.

In a dry box, an equimolar composition (liquid) of refined N-methyl-2-pyrrolidone and refined m-cresol was obtained by charging 99.1 g (1.00 mol) of the aforementioned refined N-methyl-2-pyrrolidone into a flask and further gradually adding to this 108.1 g (1.00 mol) of refined m-cresol with agitation.

The equimolar composition thus obtained was heated at normal pressure and the temperatures of the liquid and gas phases thereof during boiling were measured to give 230° C. both for the liquid phase and the gas phase. This temperature was higher by 25.5° C. than the boiling point of the refined N-methyl-2-pyrrolidone (204.5° C.) and higher by 27.8° C. than the boiling point of the refined m-cresol (202.2° C.). Further, the equimolar composition thus obtained was placed in a flask and was kept in ice water of 0° C. for 3 hours, however, the equimolar composition did not solidify and remained in a liquid state.

FIG. A1 shows IR spectra of the obtained equimolar composition and reagent-grade N-methyl-2-pyrrolidone and m-cresol. The IR spectrum of the equimolar composition shows that a broad band of 3000 to 4000 cm$^{-1}$ indicating the OH stretching vibrations, which shows the presence of intramolecular and intermolecular hydrogen bonds, and a band of 1671 cm$^{-1}$ indicating the C═O stretching vibration, shift to lower wavenumbers, as compared with those of the single species, N-methyl-2-pyrrolidone and m-cresol. Further, the C—O stretching vibration attributable to the formation of an association by hydrogen bonding is observed at 1287 cm$^{-1}$. The above results show that the equimolar composition has a strong hydrogen bond between the C═O of N-methyl-2-pyrrolidone and the OH of m-cresol.

FIGS. A2 and A3 show $^1$H-and $^{13}$C-NMR spectra of the obtained equimolar composition. The proton and carbon signals of the equimolar composition are equal to those of the well-known single species, N-methyl-2-pyrrolidone and m-cresol, indicating that no ionic bonds are formed.

The obtained equimolar composition had a dielectric constant of 24.0 and a dielectric loss tangent of 0.353. In addition, 5 g of the obtained equimolar composition was mixed with 5 g of pure water in a sample bottle and the mixture was vigorously stirred, however, the equimolar composition and the pure water were not mixed and were kept separated in two layers.

Example A2

Into a simple evaporation distillation apparatus equipped with a vacuum device, cooling tube, efflux receptor, and thermometer, into which nitrogen had been incorporated with a capillary, 40 g of the composition obtained in Example A1 was charged. After the pressure of the inside of the system was lowered to 1.33×10$^4$ Pa, the temperature was gradually raised from room temperature in an oil bath and three distillates of about 10 g each of distillate solution were separately fractionated from the start of distillation.

The obtained compositions of the forerun, middle-run, post-run and bottom (about 10 g each) were measured by a gas chromatography (column: UniotrHP 80/100 KG-02, 3.2φ×6 m, column temperature 180° C.) to give each the same composition, N-methyl-2-pyrrolidone/m-cresol=

47.8% by weight/52.2% by weight (1:1 by molar ratio), that is, no difference in compositions thereof was found. In addition, the calibration curve was constructed using the refined N-methyl-2-pyrrolidone and the refined m-cresol prepared in Example A1.

Example A3

Distillation was conducted in the same manner as in Example A2 except that the internal pressure of flask of $1.33 \times 10^3$ Pa was used instead of that of $1.33 \times 10^4$ Pa in Example A2, to thereby obtain about 10 g each of the forerun, middle-run, post-run and bottom. The compositions of N-methyl-2-pyrrolidone and m-cresol contained therein were determined in the same manner as in Example A2 to give each the same composition, N-methyl-2-pyrrolidone/m-cresol=47.8% by weight/52.2% by weight (1:1 by molar ratio), that is, no difference in compositions thereof was found.

Example A4

N-methyl-2-pyrrolidone (100.0 g, 1.01 mol) and m-cresol (100.0 g, 0.925 mol) were precisely weighed and charged into a simple distillation apparatus equipped with a cooling tube, distillate liquid receiver, and thermometer, and then simple evaporation distillation was carried out in a nitrogen atmosphere at normal pressure. After about 20 g of a forerun was distilled and the temperature of the column head was stabilized at 230° C., the receiver was replaced with another one and the distillation was continued to give about 170 g of a mainrun. The composition of the mainrun thus obtained was N-methyl-2-pyrrolidone/m-cresol=47.8% by weight/52.2% by weight (1:1 by molar ratio).

Example A5

About 100 g of the mainrun obtained in Example A4 was charged into a flask equipped with a cooling tube and distillate liquid receiver and then was boiled in a nitrogen atmosphere at normal pressure. The amount was totally recovered with the distillate liquid receiver. The recovered liquid was again boiled in a similar manner and was recovered. The composition of the liquid thus obtained was N-methyl-2-pyrrolidone/m-cresol=47.8% by weight/52.2% by weight (1:1 by molar ratio).

Examples A6 to A8

The equimolar composition of the refined N-methyl-2-pyrrolidone and the refined m-cresol and the refined N-methyl-2-pyrrolidone or the refined m-cresol, obtained in Example A1, were blended according to the amounts indicated in Table A1. The boiling points as measured in the same manner as in Example A1 are shown in Table A1.

In addition, the solutions shown in Table A1 were individually placed in flasks and were kept in ice water of 0° C. for 3 hours, however, the solutions did not solidify and remained in a liquid state.

Comparative Examples A1 to A4

The equimolar composition of the refined N-methyl-2-pyrrolidone and the refined m-cresol and the refined N-methyl-2-pyrrolidone or the refined m-cresol, obtained in Example A1, were blended according to the amounts indicated in Table A1. The boiling points as measured in the same manner as in Example A1 are shown in Table A1.

Example A9

P-cresol (reagent grade) was distilled in the same manner as in Example A1 to prepare refined p-cresol having a boiling point of 201.9° C. and a water content of 10 ppm or less.

In a dry box, an equimolar composition (liquid) of refined N-methyl-2-pyrrolidone and refined p-cresol was obtained by charging 99.1 g (1.00 mol) of the refined N-methyl-2-pyrrolidone prepared in Example A1 into a flask and further gradually adding to this 108.1 g (1.00 mol) of the above refined p-cresol with agitation.

The equimolar composition thus obtained was heated at normal pressure and the temperatures of the liquid and gas phases thereof during boiling were measured to give 228° C. both for the liquid phase and the gas phase. This temperature was higher by 23.5° C. than the boiling point of the refined N-methyl-2-pyrrolidone (204.5° C.) and higher by 26.1° C. than the boiling point of the refined p-cresol (201.9° C.). Further, the equimolar composition thus obtained was placed in a flask and was kept in ice water of 0° C. for 3 hours, however, the equimolar composition did not solidify and remained in a liquid state.

In addition, 5 g of the obtained equimolar composition was mixed with 5 g of pure water in a sample bottle and the mixture was vigorously stirred, however, the equimolar composition and the pure water were not mixed and were kept separated in two layers.

Example A10

P-chlorophenol (reagent grade) was distilled in the same manner as in Example A1 to prepare refined p-chlorophenol having a boiling point of 217° C. and a water content of 10 ppm or less.

In a dry box, an equimolar composition (liquid) of refined N-methyl-2-pyrrolidone and refined p-chlorophenol was obtained by charging 99.1 g (1.00 mol) of the refined N-methyl-2-pyrrolidone prepared in Example A1 into a flask and further gradually adding to this 128.6 g (1.00 mol) of the above refined p-chlorophenol with agitation.

The equimolar composition thus obtained was heated at normal pressure and the temperatures of the liquid and gas phases thereof during boiling were measured to give 245° C. both for the liquid phase and the gas phase. This temperature was higher by about 41° C. than the boiling point of the refined N-methyl-2-pyrrolidone (204.5° C.) and higher by 28° C. than the boiling point of the refined p-chlorophenol (217° C.). Further, the equimolar composition thus obtained was placed in a flask and was kept in ice water of 0° C. for 3 hours, however, the equimolar composition did not solidify and remained in a liquid state.

FIG. A4 shows IR spectra of the obtained equimolar composition and reagent-grade N-methyl-2-pyrrolidone and p-chlorophenol. The IR spectrum of the equimolar composition shows that a broad band of 3000 to 4000 $cm^{-1}$ indicating the OH stretching vibrations, which shows the presence of intramolecular and intermolecular hydrogen bonds, and a band of 1671 $cm^{-1}$ indicating the C=O stretching vibration, shift to lower wavenumbers, as compared with those of the single species, N-methyl-2-pyrrolidone and p-chlorophenol. Further, the C—O stretching vibration attributable to the formation of an association by hydrogen bonding is observed at 1269 $cm^{-1}$. The above results show that the equimolar composition has a strong hydrogen bond between the C=O of N-methyl-2-pyrrolidone and the OH of p-chlorophenol.

FIGS. A5 and A6 show $^1$H- and $^{13}$C-NMR spectra of the obtained equimolar composition. The proton and carbon signals of the equimolar composition are equal to those of the well-known single species, N-methyl-2-pyrrolidone and p-chlorophenol, indicating that no ionic bonds are formed.

The obtained equimolar composition had a dielectric constant of 32.8 and a dielectric loss tangent of 0.434. In addition, 5 g of the obtained equimolar composition was mixed with 5 g of pure water in a sample bottle and the mixture was vigorously stirred, however, the equimolar composition and the pure water were not mixed and were kept separated in two layers.

TABLE A1

| Equimolar composition | Amount of formulation (g) | | | Content of equimolar composition (wt %) | Boiling point (° C.) |
|---|---|---|---|---|---|
| | N-methyl-2-pyrrolidone | m-cresol | | | |
| Comp. Ex. A1 | 0 | 0 | 25.0 | 0 | 202 |
| Comp. Ex. A2 | 10.4 | 0 | 14.6 | 41.6 | 209 |
| Example A6 | 20.9 | 0 | 4.1 | 83.6 | 228 |
| Example A7 | 25.0 | 0 | 0 | 100 | 230 |
| Example A8 | 19.3 | 5.7 | 0 | 77.2 | 224 |
| Comp. Ex. A3 | 9.6 | 15.4 | 0 | 38.4 | 213 |
| Comp. Ex. A4 | 0 | 25.0 | 0 | 0 | 204 |

Equimolar composition: equimolar composition of refined N-methyl-2-pyrrolidone and refined m-cresol
Content: (amount of equimolar composition (g)/total amount of formulation (25 g)) × 100 (wt %)

Example B1

Refined 1,3-dimethyl-2-imidazolidinone having a boiling point of 225.5° C. and a water content of 10 ppm or less was prepared by charging 1,3-dimethyl-2-imidazolidinone into a flask equipped with a sufficiently dried packed column and distilling it in a nitrogen atmosphere at normal pressure. In addition, m-cresol (reagent grade) was similarly distilled to give refined m-cresol having a boiling point of 202.2° C. and a water content of 10 ppm or less.

In a dry box, an equimolar composition (liquid) of refined 1,3-dimethyl-2-imidazolidinone and refined m-cresol was obtained by charging 114.1 g (1.00 mol) of the aforementioned refined 1,3-dimethyl-2-imidazolidinone into a flask and further adding to this 108.1 g (1.00 mol) of refined m-cresol with agitation.

The equimolar composition thus obtained was heated at normal pressure and the temperatures of the liquid and gas phases thereof during boiling were measured to give 237° C. both for the liquid phase and the gas phase. This temperature was higher by about 12° C. than the boiling point of the refined 1,3-dimethyl-2-imidazolidinone (225.5° C.) and higher by about 35° C. than the boiling point of the refined m-cresol (202.2° C.). Further, the equimolar composition thus obtained was placed in a flask and was kept in ice water of 0° C. for 3 hours, however, the equimolar composition did not solidify and remained in a liquid state.

FIG. B1 shows IR spectra of the obtained equimolar composition and reagent-grade 1,3-dimethyl-2-imidazolidinone and m-cresol. The IR spectrum of the equimolar composition shows that a broad band of 3000 to 4000 cm$^{-1}$ indicating the OH stretching vibrations, which shows the presence of intramolecular and intermolecular hydrogen bonds, and a band of 1693 cm$^{-1}$ indicating the C=O stretching vibration, shift to lower wavenumbers, as compared with those of the single species, 1,3-dimethyl-2-imidazolidinone and m-cresol. The above results show that the equimolar composition has a strong hydrogen bond between the C=O of 1,3-dimethyl-2-imidazolidinone and the OH of m-cresol.

FIGS. B2 and B3 show $^1$H- and $^{13}$C-NMR spectra of the obtained equimolar composition. The proton and carbon signals of the equimolar composition are equal to those of the well-known single species, 1,3-dimethyl-2-imidazolidinone and m-cresol, indicating that no ionic bonds are formed.

The obtained equimolar composition had a dielectric constant of 24.1 and a dielectric loss tangent of 0.412. In addition, 5 g of the obtained equimolar composition was mixed with 5 g of pure water in a sample bottle and the mixture was vigorously stirred, however, the equimolar composition and the pure water were not mixed and were kept separated in two layers.

Example B2

Into a simple evaporation distillation apparatus equipped with a vacuum device, cooling tube, efflux receptor, and thermometer, into which nitrogen had been incorporated with a capillary, 40 g of the composition obtained in Example B1 was charged. After the pressure of the inside of the system was lowered to 1.33×10$^4$ Pa, the temperature was gradually raised from room temperature in an oil bath and three distillates of about 10 g each of distillate solution were separately distilled from the start of distillation.

The obtained compositions of the forerun, middle-run, post-run and bottom (about 10 g each) were measured by a gas chromatography (column: UniotrHP 80/100 KG-02, 3.2φ×6 m, column temperature 180° C.) to give each the same composition, 1,3-dimethyl-2-imidazolidinone/m-cresol=51.35% by weight/48.65% by weight (1:1 by molar ratio), that is, no difference in compositions thereof was found. In addition, the calibration curve was constructed using the refined 1,3-dimethyl-2-imidazolidinone and the refined m-cresol prepared in Example B1.

Example B3

Distillation was conducted in the same manner as in Example B2, except that the internal pressure of flask of 1.33×10$^3$ Pa was used instead of that of 1.33×10$^4$ Pa in Example B2, to thereby obtain about 10 g each of the forerun, middle-run, post-run and bottom. The compositions of 1,3-dimethyl-2-imidazolidinone and m-cresol contained therein were determined in the same manner as in Example B2 to give each the same composition, 1,3-dimethyl-2-imidazolidinone/m-cresol=51.35% by weight/48.65% by weight (1:1 by molar ratio), that is, no difference in compositions thereof was found.

Example B4

1,3-dimethyl-2-imidazolidinone (100.0 g, 0.876 mol) and m-cresol (100.0 g, 0.925 mol) were precisely weighed and charged into a simple distillation apparatus equipped with a cooling tube, distillate liquid receiver, and thermometer, and then simple evaporation distillation was carried out in a nitrogen atmosphere at normal pressure. After about 30 g of a forerun was distilled and the temperature of the column head was stabilized at 237° C., the receiver was replaced with another one and the distillation was continued to give about 155 g of a mainrun. The composition of the mainrun thus obtained was 1,3-dimethyl-2-imidazolidinone/m-cresol=51.35% by weight/48.65% by weight (1:1 by molar ratio).

Example B5

The mainrun (100 g) obtained in Example B4 was charged into a flask equipped with a cooling tube and distillate liquid receiver and then was boiled in a nitrogen atmosphere at normal pressure. The amount was totally recovered with the distillate liquid receiver. The recovered liquid was again boiled in a similar manner and was recovered. The composition of the liquid thus obtained was 1,3-dimethyl-2-imidazolidinone/m-cresol=51.35% by weight/48.65% by weight (1:1 by molar ratio).

Example B6

P-cresol (reagent grade) was distilled in the same manner as in Example B1 to prepare refined p-cresol having a boiling point of 201.9° C. and a water content of 10 ppm or less.

In a dry box, an equimolar composition (liquid) of refined 1,3-dimethyl-2-imidaxolidinone and refined p-cresol was obtained by charging 114.1 g (1.00 mol) of the refined 1,3-dimethyl-2-imidazolidinone prepared in Example B1 into a flask and further gradually adding to this 108.1 g (1.00 mol) of the above refined p-cresol with agitation.

The equimolar composition thus obtained was heated at normal pressure and the temperatures of the liquid and gas phases thereof during boiling were measured to give 236° C. both for the liquid phase and the gas phase. This temperature was higher by about 11° C. than the boiling point of the refined 1,3-dimethyl-2-imidazolidinone (225.5° C.) and higher by about 34° C. than the boiling point of the refined p-cresol (201.9° C.). Further, the equimolar composition thus obtained was placed in a flask and was kept in ice water of 0° C. for 3 hours, however, the equimolar composition did not solidify and remained in a liquid state.

In addition, 5 g of the obtained equimolar composition was mixed with 5 g of pure water in a sample bottle and the mixture was vigorously stirred, however, the equimolar composition and the pure water were not mixed and were kept separated in two layers.

Example B7

Phenol (reagent grade) was distilled in the same manner as in Example B1 to prepare refined phenol having a boiling point of 181.2° C. and a water content of 10 ppm or less.

In a dry box, an equimolar composition (liquid) of refined 1,3-dimethyl-2-imidazolidinone and refined phenol was obtained by charging 114.1 g (1.00 mol) of the refined 1,3-dimethyl-2-imidazolidinone prepared as described in Example B1 into a flask and further gradually adding to this 94.1 g (1.00 mol) of the above refined phenol with agitation.

The equimolar composition thus obtained was heated at normal pressure and the temperatures of the liquid and gas phases thereof during boiling were measured to give 229° C. both for the liquid phase and the gas phase. This temperature was higher by about 4° C. than the boiling point of the refined 1,3-dimethyl-2-imidazolidinone (225.5° C.) and higher by about 48° C. than the boiling point of the refined phenol (181.2° C.). Further, the equimolar composition thus obtained was placed in a flask and was kept in ice water of 0° C. for 3 hours, however, the equimolar composition did not solidify and remained in a liquid state.

In addition, 5 g of the obtained equimolar composition was mixed with 5 g of pure water in a sample bottle and the mixture was vigorously stirred, however, the equimolar composition and the pure water were not mixed and were kept separated in two layers.

Example B8

P-chlorophenol (reagent grade) was distilled in the same manner as in Example B1 to prepare refined p-chlorophenol having a boiling point of 217° C. and a water content of 10 ppm or less.

In a dry box, an equimolar composition (liquid) of refined 1,3-dimethyl-2-imidazolidinone and refined p-chlorophenol was obtained by charging 114.1 g (1.00 mol) of the refined 1,3-dimethyl-2-imidazolidinone prepared as in Example B1 into a flask and further gradually adding to this 128.6 g (1.00 mol) of the above refined p-chlorophenol with agitation.

The equimolar composition thus obtained was heated at normal pressure and the temperatures of the liquid and gas phases thereof during boiling were measured to give 257° C. both for the liquid phase and the gas phase. This temperature was higher by about 32° C. than the boiling point of the refined 1,3-dimethyl-2-imidazolidinone (225.5° C.) and higher by 40° C. than the boiling point of the refined p-chlorophenol (217° C.). Further, the equimolar composition thus obtained was placed in a flask and was kept in ice water of 0° C. for 3 hours, however, the equimolar composition did not solidify and remained in a liquid state.

FIG. B4 shows IR spectra of the obtained equimolar composition and reagent-grade 1,3-dimethyl-2-imidazolidinone and p-chlorophenol. The IR spectrum of the equimolar composition shows that a broad band of 3000 to 4000 $cm^{-1}$ indicating the OH stretching vibrations, which shows the presence of intramolecular and intermolecular hydrogen bonds, and a band of 1693 $cm^{-1}$ indicating the C=O stretching vibration, shift to lower wavenumbers, as compared with those of the single species, 1,3-dimethyl-2-imidazolidinone and p-chlorophenol. The above results show that the equimolar composition has a strong hydrogen bond between the C=O of 1,3-dimethyl-2-imidazolidinone and the OH of p-chlorophenol.

FIGS. B5 and B6 show $^1H$- and $^{13}C$-NMR spectra of the obtained equimolar composition. The proton and carbon signals of the equimolar composition are equal to those of the well-known single species, 1,3-dimethyl-2-imidazolidinone and p-chlorophenol, indicating that no ionic bonds are formed.

The obtained equimolar composition had a dielectric constant of 32.5 and a dielectric loss tangent of 0.495. In addition, 5 g of the obtained equimolar composition was mixed with 5 g of pure water in a sample bottle and the mixture was vigorously stirred; however, the equimolar composition and the pure water were not mixed and were kept separated in two layers.

Examples B9 to B11

The equimolar composition of the refined 1,3-dimethyl-2-imidazolidinone and the refined p-chlorophenol, the refined 1,3-dimethyl-2-imidazolidinone or the refined p-chlorophenol, obtained in Example B1, was blended according to the amounts indicated in Table B1. The boiling points as measured in the same manner as in Example B1 are shown in Table B1.

In addition, the solutions shown in Table B1 were individually placed in flasks and were kept in ice water of 0° C. for 3 hours, however, the solutions did not solidify and remained in a liquid state.

Comparative Examples B1 and B2

An equimolar composition of the refined 1,3-dimethyl-2-imidazolidinone and the refined p-chlorophenol, the refined 1,3-dimethyl-2-imidazolidinone or the refined p-chlorophenol, obtained in Example B1, was blended according to the amounts indicated in Table B1. The boiling points as measured in the same manner as in Example B1 are shown in Table B1.

TABLE B1

| | Amount of formulation (g) | | | Content | |
|---|---|---|---|---|---|
| | Equimolar composition | 1,3-Dimethyl-2-imidazo-lidinone | p-chloro-phenol | of equimolar composition (wt %) | Boiling point (° C.) |
| Comp. Ex. B1 | 0 | 0 | 25.0 | 0 | 217 |
| Example B9 | 19.5 | 0 | 5.5 | 78.0 | 251 |
| Example B10 | 25.0 | 0 | 0 | 100 | 257 |
| Example B11 | 20.6 | 4.4 | 0 | 82.4 | 243 |
| Comp. Ex. B2 | 0 | 25.0 | 0 | 0 | 225 |

Equimolar composition: equimolar composition of refined 1,3-dimethyl-2-imidazolidinone and refined p-chlorophenol
Content: (amount of equimolar composition (g)/total amount of formulation (25 g)) × 100 (wt %)

Examples C1 to C9 and Comparative Examples C1 to C9

Into a vessel equipped with a stirrer, reflux condenser, water separator, and nitrogen inlet, were charged 799 g of a solvent of a composition indicated in Table C1 (the amount of solvent of 2570 g only for Comparative Example C9) and the raw material monomers of a polyimide:
(1) 1,3-bis(4-aminophenoxy)benzene, 146.17 g (0.500 mol);
(2) 3,3',4,4'-biphenyltetracarboxylic dianhydride, 143.43 g (0.4875 mol); and
(3) phthalic anhydride, 3.703 g (25.00 mmol).
This mixture was heated from room temperature to 200° C. over 150 min with stirring in a nitrogen atmosphere and was allowed to react at 200° C. for 12 hours. In addition, the theoretical yield of polymer in this case is 275.3 g and the concentration of polymer is 25.6% (9.7% only for Comparative Example C9).

Table C2 shows the states of reaction solutions in the process of raising temperature from room temperature to 200° C. and in the reaction process at 200° C. Note that each symbol in Table C2 indicates a following state.
SL: Slurry state
B: Polyimide dissolves
C: Polyimide slightly precipitates or slightly remains undissolved
D: Polyimide partly solidifies and adheres to wall and spring of stirrer and the like
Further, for reaction solutions being capable of agitation (Examples C1 to C9 and Comparative Example C9), a solution wherein 3.703 g (25.00 mmol) of phthalic anhydride was dissolved in 70 g of each solvent was dropped into a corresponding reaction solution, and the reaction was continued at 200° C. for another 6 hours.

Thereafter, the inside of the reaction system was cooled to 30° C., and the obtained precipitates were filtered for Examples C1 to C9. Comparative Example C9 did not give a precipitate in this stage, and the obtained viscous polymer solution was placed in 10 liters of toluene with vigorous stirring, and the precipitated polymer was collected by filtration.

Furthermore, for Examples C1 to C9, the obtained polymer was washed with 1 liter of a respective solvent thereof, followed by 1 liter of toluene. In addition, for Comparative Example C9, the obtained polymer was washed with 2 liters of toluene. The polymers thus obtained were subjected to preliminary drying at 50° C. for 24 hours, followed by drying in a nitrogen flow at 300° C. for 12 hours.

For Examples C1 to C9 and Comparative Example C9, the obtained polyimide powder was subjected to measurement by the aforementioned methods of inherent viscosity, glass transition temperature, 5% by-weight decrease temperature, and melt viscosity (430° C./5 min). The results obtained are shown in Table C3.

In addition, Examples C1 to C9 indicate that use of solvents relating to the present invention makes it possible to adequately synthesize a polyimide in a high concentration (about 25% by weight) wherein it is impossible to realize synthesis in normal solvent system as is shown in Comparative Example C (Comparative Example C2, C4, C6 or C8), and that the obtained polyimide by a process of the present invention exhibits physical properties equivalent to those of a polyimide obtained by low concentration polymerization (Comparative Example C9, about 10% by weight) in a normal solvent system.

Moreover, according to the preparation process of the present invention, the reaction system is in a slurry state, and thus the polyimide can be isolated by filtration only, leading to an easy and simple process. Additionally, this polyimide is totally comparable to one obtained by a normal process in physical properties and exhibits good heat resistance.

TABLE C1

| | Equimolar composition (A) | Solvent (B) | Blending ratio (A)/(B) [wt/wt] |
|---|---|---|---|
| Example C1 | m-cresol/N-methyl-2-pyrrolidone | Not used | 100/0 |
| Example C2 | | m-cresol | 75/25 |
| Example C3 | | | 50/50 |
| Comparative Example C1 | | | 25/75 |
| Comparative Example C2 | | | 0/100 |
| Example C4 | | N-methyl-2-pyrrolidone | 75/25 |
| Example C5 | | | 50/50 |
| Comparative Example C3 | | | 25/75 |
| Comparative Example C4 | | | 0/100 |
| Example C6 | | p-cresol | 75/25 |
| Example C7 | | | 50/50 |
| Comparative Example C5 | | | 25/75 |
| Comparative Example C6 | | | 0/100 |
| Example C8 | | N,N'-dimethyl-imidazoli-dinone | 75/25 |
| Example C9 | | | 50/50 |
| Comparative Example C7 | | | 25/75 |
| Comparative Example C8 | | | 0/100 |
| Comparative Example C9 | | m-cresol | 0/100 |

TABLE C2

| Temperature | Room temperature | 50° C. | 100° C. | 150° C. | 200° C. | | | | |
|---|---|---|---|---|---|---|---|---|---|
| Time duration | | | | | 0 hr | 3 hr | 6 hr | 9 hr | 12 hr |
| Example C1 | SL | SL | B | C | SL | SL | SL | SL | SL |
| Example C2 | SL | SL | B | C | SL | SL | SL | SL | SL |
| Example C3 | SL | SL | B | SL | SL | SL | SL | SL | SL |
| Comparative Example C1 | SL | SL | SL | D | D | Agitation becomes difficult | | | |
| Comparative Example C2 | SL | SL | SL | B | Agitation becomes difficult and the system solidifies | | | | |
| Example C4 | SL | SL | B | C | SL | SL | SL | SL | SL |
| Example C5 | SL | SL | B | C | SL | SL | SL | SL | SL |
| Comparative Example C3 | SL | SL | B | B | The system suddenly precipitates and solidifies near 180° C. | | | | |
| Comparative Example C4 | SL | SL | B | B | The system suddenly precipitates and solidifies near 190° C. | | | | |
| Example C6 | SL | SL | B | C | SL | SL | SL | SL | SL |
| Example C7 | SL | SL | B | C | SL | SL | SL | SL | SL |
| Comparative Example C5 | SL | SL | SL | D | D | D | Agitation becomes difficult | | |
| Comparative Example C6 | SL | SL | SL | B | Agitation becomes difficult and the system solidifies | | | | |
| Example C8 | SL | SL | B | C | SL | SL | SL | SL | SL |
| Example C9 | SL | SL | B | C | SL | SL | SL | SL | SL |
| Comparative Example C7 | SL | SL | B | B | The system suddenly precipitates and solidifies near 190° C. | | | | |
| Comparative Example C8 | SL | SL | B | B | The system suddenly precipitates and solidifies near 200° C. | | | | |
| Comparative Example C9 | SL | SL | SL | B | B | B | B | B | B |

TABLE D3

| Temperature | Inherent viscosity [dl/g] | Glass transition temperature [° C.] | Melting point [° C.] | 5% by-weight decrease temperature [° C.] | Melt viscosity [Pa · sec] (430° C./5 min.) |
|---|---|---|---|---|---|
| Example C1 | 0.93 | 192 | 395 | 563 | 660 |
| Example C2 | 0.92 | 192 | 396 | 565 | 680 |
| Example C3 | 0.92 | 193 | 396 | 565 | 670 |
| Example C4 | 0.95 | 192 | 395 | 564 | 650 |
| Example C5 | 0.94 | 192 | 395 | 563 | 640 |
| Example C6 | 0.92 | 192 | 395 | 562 | 660 |
| Example C7 | 0.90 | 193 | 396 | 565 | 690 |
| Example C8 | 0.93 | 192 | 396 | 565 | 680 |
| Example C9 | 0.96 | 193 | 395 | 564 | 680 |
| Comparative Example C9 | 0.98 | 193 | 396 | 565 | 720 |

Examples C10 to C12 and Comparative Examples C10 and C11

Into a vessel equipped with a stirrer, reflux condenser, water separator, and nitrogen inlet, were charged 2437 g of a solvent of a composition indicated in Table C4 and the raw material monomers of a polyimide:

(1) 4,4'-bis(3-aminophenoxy)biphenyl, 368.43 g (1.000 mol);

(2) pyromellitic dianhydride, 102.52 g (0.470 mol);

(3) 3,3',4,4'-biphenyltetracarboxylic dianhydride, 138.28 g (0.470 mol); and (4) phthalic anhydride, 17.77 g (120.0 mmol).

This mixture was heated from room temperature to 200° C. over 150 min with stirring in a nitrogen atmosphere and was allowed to react at 200° C. for 4 hours. In addition, the theoretical yield of polymer in this case is 591.0 g and the concentration of polymer is 19.5%.

Table C5 shows the states of reaction solutions in the process of raising temperature from room temperature to 200° C. and in the reaction process at 200° C. Note that each symbol in Table C5 indicates a following state.

SL: Polyimide precipitates and the reaction solution is in a slurry state

B: Polyimide dissolves

C: Polyimide slightly precipitates or slightly remains unsolved

D: Polyimide partly solidifies and adheres to wall and spring of stirrer and the like Further, into each of reaction solutions being capable of agitation (Examples C10 to C12 and Comparative Example C10), 17.77 g (120.0 mmol) of phthalic anhydride was charged, and the reaction was continued at 200° C. for another 4 hours.

Thereafter, the inside of the reaction system was cooled to 30° C., and the obtained precipitates were filtered for Examples C10 to C12. Comparative Example C10 did not give a precipitate in this stage and the obtained viscous polymer solution was placed in 10 liters of toluene with vigorous stirring, and the precipitated polymer was collected by filtration.

Furthermore, for Examples C10 to C12, the obtained polymer was washed with 1 liter of a respective solvent thereof, followed by 1 liter of toluene. In addition, for Comparative Example C10, the obtained polymer was washed with 2 liters of toluene. The polymers thus obtained were subjected to preliminary drying at 50° C. for 24 hours, followed by vacuum drying in a nitrogen flow at 200° C. for 12 hours.

For Examples C10 to C12 and Comparative Example C10, the obtained polyimide powder was subjected to measurement by the aforementioned methods of inherent viscosity, glass transition temperature, and 5% by-weight decrease temperature. The results obtained are shown in Table C6.

TABLE C4

| | Equimolar composition (A) | Solvent (B) | Blending ratio (A)/(B) [wt/wt] |
|---|---|---|---|
| Example C10 | Mixture of m- and p-cresols/N-methyl-2-pyrrolidone | Not used | 100/0 |
| Example C11 | | Mixture of m- and p-cresols | 75/25 |
| Comparative Example C10 | | | 0/100 |
| Example C12 | | N-methyl-2-pyrrolidone | 75/25 |
| Comparative Example C11 | | | 0/100 |

TABLE C5

| Temperature | Room temperature | 50° C. | 100° C. | 150° C. | 200° C. | | | | |
|---|---|---|---|---|---|---|---|---|---|
| Time duration | | | | | 0 hr | 1 hr | 2 hr | 3 hr | 4 hr |
| Example C10 | SL | SL | B | C | SL | SL | SL | SL | SL |
| Example C11 | SL | SL | B | C | SL | SL | SL | SL | SL |
| Comparative Example C10 | SL | SL | SL | B | B | B | B | B | B |
| Example C12 | SL | SL | B | SL | SL | SL | SL | SL | SL |
| Comparative Example C11 | SL | SL | B | B | The system suddenly precipitates and solidifies near 190° C. | | | | |

TABLE C6

| Temperature | Inherent viscosity [dl/g] | Glass transition temperature [° C.] | 5% by-weight decrease temperature [° C.] |
|---|---|---|---|
| Example C10 | 0.44 | 239 | 556 |
| Example C11 | 0.45 | 238 | 557 |
| Comparative Example C10 | 0.46 | 239 | 555 |
| Example C12 | 0.44 | 238 | 555 |

From the results of these Examples C1 to C12, according to the preparation process of the present invention, the reaction system is in a slurry state, and thus the polyimide can be isolated by filtration only, leading to an easy and simple process. In addition, this polyimide is totally comparable to one obtained by a normal process in physical properties and exhibits good heat resistance.

Example C13

A polyimide was obtained in the same conditions as in Example C10 except that instead of both the first charging of phthalic anhydride and the second charging of phthalic anhydride for a reaction solution being capable of agitation in Example C10, 10.66 g (72.00 mmol) of phthalic anhydride and 11.92 g (48.00 mmol) of 4-phenylethynylphthalic anhydride were, respectively, charged. The polyimide powder thus obtained had a glass transition temperature of 238° C.

Further, this powder was melted in a furnace at 360° C. and was maintained for 4 hours to yield a lump of polyimide. This polyimide showed a glass transition temperature of 246° C.

Examples D1 to D9 and Comparative Examples D1 to D9

Into a vessel equipped with a stirrer, reflux condenser, water separator, and nitrogen inlet, were charged 799 g of a solvent of a composition indicated in Table D1 (the amount of solvent of 2570 g only for Comparative Example D9) and the raw material monomers of a polyimide:

(1) 1,3-bis(4-aminophenoxy)benzene, 146.17 g (0.500 mol);

(2) 3,3',4,4'-biphenyltetracarboxylic dianhydride, 143.43 g (0.4875 mol); and (3) phthalic anhydride, 3.703 g (25.00 mmol).

This mixture was heated from room temperature to 200° C. over 150 min with stirring in a nitrogen atmosphere and was allowed to react at 200° C. for 12 hours. In addition, the theoretical yield of polymer in this case is 275.3 g and the concentration of polymer is 25.6% (9.7% only for Comparative Example D9).

Table D2 shows the states of reaction solutions in the process of raising temperature from room temperature to 200° C. and in the reaction process at 200° C. Note that each symbol in Table D2 indicates a following state.

SL: Slurry state

B: Polyimide dissolves

C: Polyimide slightly precipitates or slightly remains unsolved

D: Polyimide partly solidifies and adheres to wall and spring of stirrer and the like Further, for reaction solutions being capable of agitation (Examples D1 to D9 and Comparative Example D9), a solution wherein 3.703 g (25.00 mmol) of phthalic anhydride was dissolved in 70 g of each solvent was dropped into a corresponding reaction solution, and the reaction was continued at 200° C. for another 6 hours.

Thereafter, the inside of the reaction system was cooled to 30° C., and the obtained precipitates were filtered for Examples D1 to D9. Comparative Example D9 did not give a precipitate in this stage and the viscous polymer solution obtained was placed in 10 liters of toluene with vigorous stirring, and the precipitated polymer was collected by filtration.

Furthermore, for Examples D1 to D9, the obtained polymer was washed with 1 liter of a respective solvent thereof, followed by 1 liter of toluene. In addition, for Comparative Example D7, the obtained polymer was washed with 2 liters of toluene. The polymers thus obtained were subjected to preliminary drying at 50° C. for 24 hours, followed by drying in a nitrogen flow at 300° C. for 12 hours.

For Examples D1 to D9 and Comparative Example D9, the obtained polyimide powder was subjected to measurement by the aforementioned methods of inherent viscosity, glass transition temperature, 5% by-weight decrease temperature, and melt viscosity (430° C./5 min). The results obtained are shown in Table D3.

In addition, Examples D1 to D9 show that use of solvents relating to the present invention makes it possible to adequately synthesize a polyimide in a high concentration (25% by weight) wherein it is impossible to realize synthesis in normal solvent system as is shown in Comparative Example D (Comparative Example D2, D4, D6 or D8), and that the obtained polyimide by the process of the present invention exhibits physical properties equivalent to those of the obtained polyimide by low concentration polymerization (Comparative Example D9, 10% by weight) in a normal solvent system.

Moreover, according to the preparation process of the present invention, the reaction system is in a slurry state, and thus the polyimide can be isolated by filtration only, leading to an easy and simple process. Additionally, this polyimide is totally comparable to one obtained by a normal process in physical properties and exhibits good heat resistance.

TABLE D1

| Equimolar | composition (A) | Solvent (B) | Blending ratio (A)/(B) [wt/wt] |
|---|---|---|---|
| Example D1 | m-cresol/1,3-dimethyl-2-imidazolidinone | Not used | 100/0 |
| Example D2 | | m-cresol | 75/25 |
| Example D3 | | | 50/50 |
| Comparative Example D1 | | | 25/75 |
| Comparative Example D2 | | | 0/100 |
| Example D4 | | N-methyl-2-pyrrolidone | 75/25 |
| Example D5 | | | 50/50 |
| Comparative Example D3 | | | 25/75 |
| Comparative Example D4 | | | 0/100 |
| Example D6 | | p-cresol | 75/25 |
| Example D7 | | | 50/50 |
| Comparative Example D5 | | | 25/75 |
| Comparative Example D6 | | | 0/100 |
| Example D8 | | 1,3-dimethyl-2-imidazolidinone | 75/25 |
| Example D9 | | | 50/50 |
| Comparative Example D7 | | | 25/75 |
| Comparative Example D8 | | | 0/100 |
| Comparative Example D9 | | m-cresol | 0/100 |

TABLE D2

| Temperature | Room temperature | 50° C. | 100° C. | 150° C. | 200° C. | | | | |
|---|---|---|---|---|---|---|---|---|---|
| Time duration | | | | | 0 hr | 3 hr | 6 hr | 9 hr | 12 hr |
| Example D1 | SL | SL | B | C | SL | SL | SL | SL | SL |
| Example D2 | SL | SL | B | C | SL | SL | SL | SL | SL |
| Example D3 | SL | SL | B | C | SL | SL | SL | SL | SL |
| Comparative Example D1 | SL | SL | SL | D | Agitation becomes difficult. | | | | |
| Comparative Example D2 | SL | SL | SL | B | Agitation becomes difficult and the system solidifies. | | | | |
| Example D4 | SL | SL | B | C | SL | SL | SL | SL | SL |
| Example D5 | SL | SL | B | C | SL | SL | SL | SL | SL |
| Comparative Example D3 | SL | SL | B | B | The system suddenly precipitates and solidifies near 190° C. | | | | |
| Comparative Example D4 | SL | SL | B | B | The system suddenly precipitates and solidifies near 190° C. | | | | |
| Example D6 | SL | SL | B | C | SL | SL | SL | SL | SL |
| Example D7 | SL | SL | B | C | SL | SL | SL | SL | SL |
| Comparative Example D5 | SL | SL | SL | D | Agitation becomes difficult. | | | | |
| Comparative Example D6 | SL | SL | SL | B | Agitation becomes difficult and the system solidifies. | | | | |
| Example D8 | SL | SL | B | C | SL | SL | SL | SL | SL |
| Example D9 | SL | SL | B | C | SL | SL | SL | SL | SL |
| Comparative Example D7 | SL | SL | B | B | The system suddenly precipitates and solidifies near 190° C. | | | | |

TABLE D2-continued

| Temperature | Room temperature | 50° C. | 100° C. | 150° C. | 200° C. | | | | |
|---|---|---|---|---|---|---|---|---|---|
| Comparative Example D8 | SL | SL | B | B | The system suddenly precipitates and solidifies near 190° C. | | | | |
| Comparative Example D9 | SL | SL | SL | B | B | B | B | B | B |

TABLE D3

| | Inherent viscosity [dl/g] | Glass transition temperature [° C.] | Melting point [° C.] | 5% by-weight decrease temperature [° C.] | Melt viscosity [Pa · sec] (430° C./5 min.) |
|---|---|---|---|---|---|
| Example D1 | 0.96 | 192 | 395 | 564 | 700 |
| Example D2 | 0.97 | 192 | 396 | 564 | 690 |
| Example D3 | 0.97 | 194 | 396 | 565 | 680 |
| Example D4 | 0.98 | 192 | 395 | 562 | 680 |
| Example D5 | 0.97 | 192 | 395 | 565 | 670 |
| Example D6 | 0.94 | 192 | 395 | 564 | 660 |
| Example D7 | 0.94 | 193 | 395 | 564 | 670 |
| Example D8 | 0.95 | 192 | 396 | 564 | 690 |
| Example D9 | 0.97 | 192 | 396 | 564 | 710 |
| Comparative Example D9 | 0.98 | 193 | 395 | 565 | 720 |

Examples D10 to D12 and Comparative Examples D10 and D11

Into a vessel equipped with a stirrer, reflux condenser, water separator, and nitrogen inlet, were charged 2437 g of a solvent of a composition indicated in Table D4 and the raw material of a polyimide:

(1) 4,4'-bis(3-aminophenoxy)biphenyl, 368.43 g (1.000 mol);

(2) pyromellitic dianhydride, 102.52 g (0.470 mol);

(3) 3,3',4,4'-biphenyltetracarboxylic dianhydride, 138.28 g (0.470 mol); and (4) phthalic anhydride, 17.77 g (120.0 mmol).

This mixture was heated from room temperature to 200° C. over 150 min with stirring in a nitrogen atmosphere and was allowed to react at 200° C. for 4 hours. In addition, the theoretical yield of polymer in this case is 591.0 g and the concentration of polymer is 19.5%.

Table D5 shows the states of reaction solutions in the process of raising temperature from room temperature to 200° C. and in the reaction process at 200° C. Note that each symbol in Table D5 indicates a following state.

SL: Polyimide precipitates and the reaction solution is in a slurry state

B: Polyimide dissolves

C: Polyimide slightly precipitates or slightly remains unsolved

D: Polyimide partly solidifies and adheres to wall and spring of stirrer and the like Further, into each of reaction solutions being capable of agitation (Examples D10 to D12 and Comparative Example D10), 17.77 g (120.0 mmol) of phthalic anhydride was charged, and the reaction was continued at 200° C. for another 4 hours.

Thereafter, the inside of the reaction system was cooled to 30° C., and the obtained precipitates were filtered for Examples D10 to D12. Comparative Example D10 did not give a precipitate in this stage and the obtained viscous polymer solution was placed in 10 liters of toluene with vigorous stirring, and the precipitated polymer was collected by filtration.

Furthermore, for Examples D10 to D12, the obtained polymer was washed with 1 liter of a respective solvent thereof, followed by 1 liter of toluene. In addition, for Comparative Example D10, the obtained polymer was washed with 2 liters of toluene. The polymers thus obtained were subjected to preliminary drying at 50° C. for 24 hours, followed by vacuum drying in a nitrogen flow at 200° C. for 12 hours.

For Examples D10 to D12 and Comparative Example D10, the obtained polyimide powder was subjected to measurement by the aforementioned methods of inherent viscosity, glass transition temperature, and 5% by-weight decrease temperature. The results obtained are shown in Table D6.

TABLE D4

| | Equimolar composition (A) | Solvent (B) | Blending ratio (A)/(B) [wt/wt] |
|---|---|---|---|
| Example D10 | Mixture of m- and p-cresols/ 1,3-dimethyl-2-imidazolidinone | Not used | 100/0 |
| Example D11 | | Mixture of m- and p-cresols | 75/25 |
| Comparative Example D10 | | | 0/100 |
| Example D12 | | 1,3-Dimethyl-2-imidazolidinone | 75/25 |
| Comparative Example D11 | | | 0/100 |

TABLE D5

| Temperature | Room temperature | 50° C. | 100° C. | 150° C. | 200° C. | | | | |
|---|---|---|---|---|---|---|---|---|---|
| Time duration | | | | | 0 hr | 1 hr | 2 hr | 3 hr | 4 hr |
| Example D10 | SL | SL | B | C | SL | SL | SL | SL | SL |
| Example D11 | SL | SL | B | C | SL | SL | SL | SL | SL |
| Comparative Example D10 | SL | SL | SL | B | B | B | B | B | B |
| Example D12 | SL | SL | B | C | SL | SL | SL | SL | SL |
| Comparative Example D11 | SL | SL | B | B | The system suddenly precipitates and solidifies near 190° C. | | | | |

TABLE D6

| | Inherent viscosity [dl/g] | Glass transition temperature [° C.] | 5% by-weight decrease temperature [° C.] |
|---|---|---|---|
| Example D10 | 0.45 | 237 | 557 |
| Example D11 | 0.45 | 238 | 557 |
| Comparative Example D10 | 0.44 | 238 | 557 |
| Example D12 | 0.44 | 238 | 556 |

From these results, according to the preparation process of the present invention, the reaction system is in a slurry state, and thus the polyimide can be isolated by filtration only, leading to an easy and simple process. In addition, this polyimide is totally comparable to one obtained by a normal process in physical properties and exhibits good heat resistance.

Example D13

A polyimide was obtained in the same conditions as in Example D10 except that instead of both the first charging of phthalic anhydride and the second charging of phthalic anhydride for a reaction solution being capable of agitation in Example D10, 10.66 g (72.00 mmol) of phthalic anhydride and 11.92 g (48.00 mmol) of 4-phenylethynylphthalic anhydride were, respectively, charged. The polyimide powder thus obtained had a glass transition temperature of 238° C. Further, this powder was melted in a furnace at 360° C. and was maintained for 4 hours to yield a lump of polyimide. This polyimide showed a glass transition temperature of 245° C.

Examples E1 and E2 and Comparative Examples E1 to E12

The reaction was carried out in accordance with Example C1 except that 1031 g of a solvent of a composition indicated in Table E1 was used. However, in Comparative Examples E5 to E8, the reaction was conducted under reflux at a boiling temperature (180 to 200° C.) of a solvent. In addition, the theoretical yield of polymer in this case is 275.3 g and the concentration of polymer is 21.1%.

Table E2 shows the states of reaction solutions in the process of raising temperature from room temperature to a reaction temperature and in the reaction process. Note that each symbol in Table E2 indicates a following state.

SL: Slurry state

B: Polyimide dissolves

C: Polyimide slightly precipitates or slightly remains unsolved

D: Polyimide partly solidifies and adheres to wall and spring of stirrer and the like Further, for reaction solutions being capable of agitation (Examples E1 and E2 and Comparative Examples E3, E4, E8 and E10), a solution wherein 3.703 g (25.00 mmol) of phthalic anhydride was dissolved in 70 g of each solvent was dropped into a corresponding reaction solution, and the reaction was continued at 200° C. for another 6 hours.

Thereafter, the inside of the reaction system was cooled to 30° C., and the obtained precipitate was collected by filtration, and then was washed with 1 liter of a respective solvent, followed by 1 liter of toluene. The polymers thus obtained were subjected to preliminary drying at 50° C. for 24 hours, followed by drying in a nitrogen flow at 300° C. for 12 hours.

The obtained polyimide powder was subjected to measurement by the aforementioned methods of inherent viscosity, glass transition temperature, 5% by-weight decrease temperature, and melt viscosity (430° C./5 min). The results obtained are shown in Table E3.

Comparative Examples E1, E2, E5 to E7, E9, E11, and E12 indicate that the formed precipitate causes the reaction solution to suddenly become jelly or solidify as imidization proceeds, when monomers and/or polyimide precursors dissolve to make the solution homogeneous with the use of a solvent not containing an equimolar composition. In addition, Comparative Examples E3, E4, E8 and E10 show that the obtained polyimide has an abnormally high degree of polymerization (inherent viscosity) and has extremely poor thermal stability (weight decrease temperature) and melt flowability (melt viscosity), when monomers and/or polyimide precursors do not dissolve to make the reaction proceed in a slurry state with the use of a solvent not containing an equimolar composition.

TABLE E1

| | Blending solvent | | Blending ratio (A)/(B) [wt/wt] | Content of equimolar composition (wt %) |
|---|---|---|---|---|
| | Solvent (A) | Solvent (B) | | |
| Example E1 | m-cresol | N-methyl-2-pyrrolidone | 50/50 | 95.8 |
| Example E2 | | N,N'-dimethyl-imidazolidinone | 50/50 | 97.4 |
| Comparative Example E1 | | Diphenyl ether | 75/25 | — |
| Comparative Example E2 | | | 50/50 | — |
| Comparative Example E3 | | | 25/75 | — |
| Comparative Example E4 | | | 0/100 | — |
| Comparative Example E5 | | o-dichloro-benzene | 75/25 | — |
| Comparative Example E6 | | | 50/50 | — |
| Comparative Example E7 | | | 25/75 | — |
| Comparative Example E8 | | | 0/100 | — |
| Comparative Example E9 | | Benzyl alcohol | 50/50 | — |
| Comparative Example E10 | | | 0/100 | — |
| Comparative Example E11 | | Dimethyl sulfoxide | 50/50 | — |
| Comparative Example E12 | | | 0/100 | — |

Equimolar composition: equimolar composition of nitrogen-containing cyclic compounds and phenols
Content: (equimolar composition (g)/total amount of formulation (g)) × 100 (wt %)

TABLE E2

| Temperature | Room temperature | 50° C. | 100° C. | 150° C. | 200° C. * | | | | |
|---|---|---|---|---|---|---|---|---|---|
| Time duration | | | | | 0 hr | 3 hr | 6 hr | 9 hr | 12 hr |
| Example E1 | SL | SL | B | C | SL | SL | SL | SL | SL |
| Example E2 | SL | SL | B | C | SL | SL | SL | SL | SL |
| Comparative Example E1 | SL | SL | B | B | C | The system totally becomes jelly and agitation difficult | | | |
| Comparative Example E2 | SL | SL | SL | C | The system totally becomes jelly and agitation difficult | | | | |
| Comparative Example E3 | SL | SL | SL | SL | SL | SL | D | D | D |
| Comparative Example E4 | SL | SL | SL | SL | SL | SL | SL | SL | SL |
| Comparative Example E5 | SL | SL | B | B | B | The system totally becomes jelly and agitation difficult | | | |
| Comparative Example E6 | SL | SL | B | B | The system suddenly precipitates and solidifies near 170° C. | | | | |
| Comparative Example E7 | SL | SL | SL | SL | The system suddenly solidifies near 160° C. | | | | |
| Comparative Example E8 | SL | SL | SL | SL | SL | SL | SL | SL | SL |
| Comparative Example E9 | SL | SL | SL | B | The system suddenly solidifies near 180° C. | | | | |
| Comparative Example E10 | SL | SL | SL | SL | SL | SL | SL | SL | SL |
| Comparative Example E11 | SL | SL | B | B | The system suddenly precipitates and solidifies near 190° C. | | | | |
| Comparative | SL | SL | B | B | The system suddenly | | | | |

TABLE E2-continued

| Temperature | Room temperature | 50° C. | 100° C. | 150° C. | 200° C. * |
|---|---|---|---|---|---|
| Example E12 | | | | | precipitates and solidifies near 170° C. |

*: 200 to 180° C. for Comparative Examples E5 to E8

TABLE E3

| Temperature | Inherent viscosity [dl/g] | Glass transition temperature [° C.] | 5% by-weight decrease temperature [° C.] | Melt viscosity [Pa · sec] (430° C./5 min.) |
|---|---|---|---|---|
| Example E1 | 0.93 | 192 | 562 | 680 |
| Example E2 | 0.92 | 192 | 562 | 650 |
| Comparative Example E3 | 1.10 | 196 | 547 | 3240 |
| Comparative Example E4 | 1.65 | 198 | 524 | 15600 |
| Comparative Example E8 | 1.58 | 196 | 550 | Not melt or flow |
| Comparative Example E10 | 1.85 | 195 | 544 | Not melt or flow |

Examples E4 to E7, Comparative Examples E13 to E15 and Reference Example 1

The reaction was carried out in accordance with Example C10 except that 1098 g of a solvent of a composition indicated in Table E4 was used. In addition, the theoretical yield of polymer in this case is 591.0 g and the concentration of polymer is 35.0%.

Table E5 shows the states of reaction solutions in the process of raising temperature from room temperature to a reaction temperature and in the reaction process. Note that each symbol in Table E5 indicates a following state.

SL: Slurry state

B: Polyimide dissolves

C: Polyimide slightly precipitates or slightly remains undissolved

D: Polyimide partly solidifies and adheres to wall and spring of stirrer and the like Further, into each of reaction solutions being capable of agitation (Examples E4 to E7), 17.77 g (120.0 mmol) of phthalic anhydride was charged, and the reaction was continued at 200° C. for another 4 hours.

Thereafter, the inside of the reaction system was cooled to 30° C., and the obtained precipitate was collected by filtration, and then was washed with 1 liter of a respective solvent, followed by 1 liter of toluene. The polymers thus obtained were subjected to preliminary drying at 50° C. for 24 hours, followed by drying in a nitrogen flow at 200° C. for 12 hours.

The obtained polyimide powder was subjected to measurement by the aforementioned methods of inherent viscosity, glass transition temperature, 5% by-weight decrease temperature, and melt viscosity (420° C./5 min). The results obtained are shown in Table E4.

Examples E4 to E7 show that a high content of an equimolar composition in solvents used sufficiently permits the synthesis of a polyimide even in an extremely high concentration of polymer such as about 35% by weight and also results in good physical properties of the obtained polyimide.

TABLE E4

| | Blending solvent | | Blending ratio (A)/(B) [wt/wt] | Content of equimolar composition (wt %) |
|---|---|---|---|---|
| | Solvent (A) | Solvent (B) | | |
| Reference Example E1 | Mixture of m- and p-cresols | N-methyl-2-pyrrolidone | 75/25 | 52.3 |
| Example E4 | | | 50/50 | 95.8 |
| Comparative Example E13 | | | 25/75 | 47.9 |
| Comparative Example E14 | | N,N'-dimethyl-imidazolidinone | 80/20 | 38.9 |
| Example E5 | | | 60/40 | 77.9 |
| Example E6 | | | 50/50 | 97.4 |
| Example E7 | | | 40/60 | 82.2 |
| Comparative Example E15 | | | 20/80 | 41.1 |

Equimolar composition: equimolar composition of nitrogen-containing cyclic compounds and phenols
Content: (equimolar composition (g)/total amount of formulation (g)) × 100 (wt %)

TABLE E5

| Temperature | Room temperature | 50° C. | 100° C. | 150° C. | 200° C. * | | | | |
|---|---|---|---|---|---|---|---|---|---|
| Time duration | | | | | 0 hr | 3 hr | 6 hr | 9 hr | 12 hr |
| Reference Example E1 | SL | SL | B | B | The system totally becomes jelly and agitation difficult | | | | |
| Example E4 | SL | SL | SL | B | SL | SL | SL | SL | SL |

TABLE E5-continued

| Temperature | Room temperature | 50° C. | 100° C. | 150° C. | 200° C. * | | | | |
|---|---|---|---|---|---|---|---|---|---|
| Comparative Example E13 | SL | SL | B | C | The system suddenly precipitates and solidifies near 170° C. | | | | |
| Comparative Example E14 | SL | SL | B | B | The system totally becomes jelly and agitation difficult | | | | |
| Example E5 | SL | SL | SL | B | C | SL | SL | SL | SL |
| Example E6 | SL | SL | SL | B | SL | SL | SL | SL | SL |
| Example E7 | SL | SL | B | B | SL | SL | SL | SL | SL |
| Comparative Example E15 | SL | SL | B | B | The system suddenly precipitates and solidifies near 160° C. | | | | |

TABLE E6

| Temperature | Inherent viscosity [dl/g] | Glass transition temperature [° C.] | 5% by-weight decrease temperature [° C.] | Melt viscosity [Pa · sec] (420° C./5 min.) |
|---|---|---|---|---|
| Example E4 | 0.42 | 236 | 553 | 200 |
| Example E5 | 0.44 | 238 | 557 | 220 |
| Example E6 | 0.42 | 237 | 555 | 220 |
| Example E7 | 0.41 | 237 | 554 | 200 |

Examples E8 and E9

Polyimides were synthesized according to Example C10 at a reaction temperature of 200° C. for Example E8 and at a reaction temperature of 230° C. for Example E9. After the initiation of reaction, the reaction slurry solution was partly collected in 3, 6 and 9 hours. The samples were subjected to filtration and drying, followed by measurement of inherent viscosity. The results are shown in Table E7.

The results indicate that the reaction time can be shortened by making the reaction temperature higher than 200° C.

TABLE E7

| | Example E8, reaction temperature 200° C. | | | Example E9, reaction temperature 230° C. | | |
|---|---|---|---|---|---|---|
| Reaction time (hrs) | 3 | 6 | 9 | 3 | 6 | 9 |
| Inherent viscosity (dl/g) | 0.37 | 0.39 | 0.40 | 0.40 | 0.40 | 0.40 |

Examples E10 to E13, Comparative Examples E17 to E26 and Reference Example E2

Into a vessel equipped with a stirrer, reflux condenser, water separator, and nitrogen inlet, solvents and polyimide raw materials indicated in Table E8 were charged. This mixture was heated from room temperature to 200° C. over 150 min with stirring in a nitrogen atmosphere and was allowed to react at 200° C. for 4 hours. In addition, the concentration of polymer during this polymerization is 25.0%.

Table E9 shows the states of reaction solutions in the process of raising temperature from room temperature to 200° C. and in the reaction process at 200° C.

Further, 17.77 g (120.0 mmol) of phtalic anhydride was charged, and the reaction was continued at 200° C. for another 4 hours.

Thereafter, the inside of the reaction system was cooled to 30° C., and the obtained precipitate was collected by filtration and washed with 1 liter of a respective solvent, followed by 1 liter of toluene. Additionally, Comparative Examples E19, E21, E23 and E25 did not give precipitates in this stage and the obtained viscous polymer solution was placed in 10 liters of toluene with vigorous stirring, and the precipitated polymer was collected by filtration and washed with 2 liters of toluene. The polymers thus obtained were subjected to preliminary drying at 50° C. for 24 hours, followed by vacuum drying in a nitrogen flow at 200° C. for 12 hours.

For Examples E10 to E13 and Comparative Example E17, E19, E21, E23, and E25, the obtained polyimide powder was subjected to measurement by the aforementioned method of inherent viscosity and glass transition temperature. The results obtained are shown in Table E9.

TABLE E8

| | | | | | | | | Solvents | |
|---|---|---|---|---|---|---|---|---|---|
| | PMDA/BPDA composition ratio mol/mol | BAB (g) | PMDA (g) | BPDA (g) | PA (g) | Theoretical polymer yield (g) | Equimolar composition (g) | Mixture of m- and p-cresols (g) | N-methyl-2-pyrrolidone (g) |
| Reference Example E2 | 10/0 | 368.43 (1.000 mol) | 205.03 (0.940 mol) | 0.00 (0.000 mol) | 17.77 (0.120 mol) | 555.21 | 1666 | | |
| Comparative Example E17 | | | | | | | | 1666 | |
| Comparative | | | | | | | | | 1666 |

TABLE E8-continued

|  | PMDA/BPDA composition ratio mol/mol | BAB (g) | PMDA (g) | BPDA (g) | PA (g) | Theoretical polymer yield (g) | Solvents | | |
|---|---|---|---|---|---|---|---|---|---|
|  |  |  |  |  |  |  | Equimolar composition (g) | Mixture of m- and p-cresols (g) | N-methyl-2-pyrrolidone (g) |
| Example E18 |  |  |  |  |  |  |  |  |  |
| Example E10 Comparative Example E19 | 7/3 | 368.43 (1.000 mol) | 143.52 (0.658 mol) | 82.97 (0.282 mol) | 17.77 (0.120 mol) | 576.67 | 1730 | 1730 |  |
| Comparative Example E20 |  |  |  |  |  |  |  |  | 1730 |
| Example E11 Comparative Example E21 | 5/5 | 368.43 (1.000 mol) | 102.52 (0.470 mol) | 138.28 (0.470 mol) | 17.77 (0.120 mol) | 590.97 | 1773 | 1773 |  |
| Comparative Example E22 |  |  |  |  |  |  |  |  | 1773 |
| Example E12 Comparative Example E23 | 3/7 | 368.43 (1.000 mol) | 61.51 (0.282 mol) | 193.60 (0.658 mol) | 17.77 (0.120 mol) | 605.28 | 1816 | 1816 |  |
| Comparative Example E24 |  |  |  |  |  |  |  |  | 1816 |
| Example E13 Comparative Example E25 | 0/10 | 368.43 (1.000 mol) | 0.00 (0.000 mol) | 276.57 (0.940 mol) | 17.77 (0.120 mol) | 626.74 | 1880 | 1880 |  |
| Comparative Example E26 |  |  |  |  |  |  |  |  | 1880 |

BAB: 4,4'-bis(3-aminophenoxy)biphenyl
PMDA: pyromellitic dianhydride
BPDA: 3,3',4,4'-biphenyltetracarboxylic dianhydride
PA: phthalic anhydride

TABLE E9

|  | PMDA/BPDA composition ratio mol/mol | Solvent | Reaction state | | Physical properties of obtained polymers | |
|---|---|---|---|---|---|---|
|  |  |  | Temperature raising process | During reaction | Inherent viscosity (dl/g) | Glass transition temperature (° C.) |
| Reference Example E2 | 10/0 | Equimolar composition | Precipitated and solidified after dissolution | — | — | — |
| Comparative Example E17 |  | Mixture of m- and p-cresols | Precipitated after dissolution | Slurry | 0.43 | 250 |
| Comparative Example E18 |  | N-methyl-2-pyrrolidone | Precipitated and solidified after dissolution | — | — | — |
| Example E10 | 7/3 | Equimolar composition | Precipitated after dissolution | Slurry | 0.42 | 237 |
| Comparative Example E19 |  | Mixture of m- and p-cresols | Dissolved at 80° C. | Dissolved | 0.44 | 238 |
| Comparative Example E20 |  | N-methyl-2-pyrrolidone | Precipitated and solidified after dissolution | — | — | — |
| Example E11 | 5/5 | Equimolar composition | Precipitated after dissolution | Slurry | 0.42 | 232 |
| Comparative Example E21 |  | Mixture of m- and p-cresols | Dissolved at 80° C. | Dissolved | 0.43 | 232 |
| Comparative Example E22 |  | N-methyl-2-pyrrolidone | Precipitated and solidified after dissolution | — | — | — |
| Example E12 | 3/7 | Equimolar composition | Precipitated after dissolution | Slurry | 0.41 | 229 |
| Comparative Example E23 |  | Mixture of m- and p-cresols | Dissolved at 80° C. | Dissolved | 0.44 | 230 |
| Comparative Example E24 |  | N-methyl-2-pyrrolidone | Precipitated and solidified after dissolution | — | — | — |
| Example E13 | 0/10 | Equimolar composition | Precipitated after dissolution | Slurry | 0.42 | 224 |
| Comparative Example E25 |  | Mixture of m- and p-cresols | Dissolved at 80° C. | Dissolved | 0.44 | 225 |

TABLE E9-continued

| | PMDA/BPDA composition | | Reaction state | | Physical properties of obtained polymers | |
|---|---|---|---|---|---|---|
| | ratio mol/mol | Solvent | Temperature raising process | During reaction | Inherent viscosity (dl/g) | Glass transition temperature (° C.) |
| Comparative Example E26 | | N-methyl-2-pyrrolidone | Precipitated and solidified after dissolution | — | — | — |

BAB: 4,4'-bis(3-aminophenoxy)biphenyl
PMDA: pyromellitic dianhydride
BPDA: 3,3',4,4'-biphenyltetracarboxylic dianhydride
PA: phthalic anhydride
Equimolar composition: equimolar composition of a mixture of m- and p-cresols and N-methyl-2-pyrrolidone From the results of Comparative Example E17 and Reference Example E2, the polyimide utilizing pyromellitic dianhydride as tetracarboxylic dianhydride is not preferable since the polyimide precipitates and the reaction solution solidifies as the imidization proceeds when an equimolar composition is used as a solvent. In addition, when cresol is used as a solvent, this polyimide precipitates and becomes good slurry as the imidization proceeds.

On the other hand, for the polyimide containing 30 mol % or more of biphenyltetracarboxylic dianhydride as tetracarboxylic dianhydride, when cresol is used as a solvent, polyimide does not precipitate even though the imidization proceeds, and therefore the recovery of the polymer requires a large quantity of a poor solvent. However, when an equimolar composition is used as a solvent, a polyimide precipitates as the imidization proceeds, yielding good slurry.

These results prove that according to the process of preparing a biphenyltetracarboxylic acid type polyimide of the present invention, the reaction system is in a slurry state, and thus the polyimide can be isolated by filtration only, leading to an easy and simple process. In addition, this polyimide is totally comparable to one obtained by a normal process in physical properties and exhibits good heat resistance.

Examples E14 and E15, Comparative Examples E27 to E39 and Reference Example E3 to E5

Into a vessel equipped with a stirrer, reflux condenser, water separator, and nitrogen inlet, solvents and polyimide raw materials indicated in Table E10 were charged. This mixture was heated from room temperature to 200° C. over 2 hours with stirring in a nitrogen atmosphere and was allowed to react at 200° C. for 4 hours. In addition, the concentration of polymer during this polymerization is 25.0%.

Table E10 shows the states of reaction solutions in the process of raising temperature from room temperature to 200° C. and in the reaction process at 200° C.

These results indicate that when bis(3,4-dicarboxyphenoxy) ether dianhydride as a tetracarboxylic dianhydride and bicyclo(2,2,2)-octo-7-ene-2,3,5,6-tetracarboxylic dianhydride as an aliphatic tetracarboxylic dianhydride are used, the solvent solubility of a polyimide to be obtained is too high and a polyimide to be obtained does not precipitate even when the equimolar composition is used as a solvent.

TABLE E10

| | Diamine | | Tetracarboxylic dianhydride | | PA | Solvent | | Reaction state | |
|---|---|---|---|---|---|---|---|---|---|
| | A (g) | B (g) | C (g) | D (g) | (g) | Kind | Amount (g) | Temperature raising process | During reaction |
| Example E14 | APB | — | BPDA | — | PA | Equimolar composition | 165 | Precipitated after dissolution | Slurry |
| Comparative Example E27 | 29.23 (0.100 mol) | — | 27.95 (0.095 mol) | — | 1.48 (0.010 mol) | Mixture of m- and p-cresols | | Dissolved at 80° C. | Dissolved |
| Comparative Example E28 | | — | | — | | N-methyl-2-pyrrolidone | | Precipitated and solidified after dissolution | — |
| Reference Example E3 | APB 29.23 | — | BTDA 30.61 | — | PA 1.48 | Equimolar composition | 172 | Precipitated and solidified after dissolution | — |
| Comparative Example E30 | (0.100 mol) | — | (0.095 mol) | — | (0.010 mol) | Mixture of m- and p-cresols | | Impossible to agitate due to a gumlike state after dissolution | |
| Comparative Example E31 | | — | | — | | N-methyl-2-pyrrolidone | | Precipitated and solidified after dissolution | — |
| Reference Example E4 | APB 29.23 | — | ODPA 29.47 | — | PA 1.48 | Equimolar composition | 169 | Dissolved at 80° C. | Dissolved |
| Comparative Example E33 | (0.100 mol) | — | (0.095 mol) | — | (0.010 mol) | Mixture of m- and p-cresols | | Dissolved at 80° C. | Dissolved |

TABLE E10-continued

| | Diamine | | Tetracarboxylic dianhydride | | PA | Solvent | Amount | Reaction state | |
| | A (g) | B (g) | C (g) | D (g) | (g) | Kind | (g) | Temperature raising process | During reaction |
|---|---|---|---|---|---|---|---|---|---|
| Comparative Example E34 | — | | — | | | N-methyl-2-pyrrolidone | | Precipitated and solidified after dissolution | — |
| Reference Example E35 | APB 29.23 (0.100 mol) | — | BPDA 13.98 (0.048 mol) | BCD 11.79 (0.048 mol) | PA 1.48 (0.010 mol) | Equimolar composition | 159 | Dissolved at 80° C. | Dissolved |
| Comparative Example E36 | | | | | | Mixture of m- and p-cresols | | Dissolved at 80° C. | Dissolved |
| Comparative Example E37 | | — | | | | N-methyl-2-pyrrolidone | | Dissolved at 80° C. | Dissolved |
| Example E15 | APB 14.62 (0.050 mol) | DSDA 12.42 (0.050 mol) | BPDA 27.95 (0.095 mol) | — | PA 1.48 (0.010 mol) | Equimolar composition | 159 | Precipitated and solidified after dissolution | Slurry |
| Comparative Example E38 | | | | | | Mixture of m- and p-cresols | | Dissolved at 80° C. | Dissolved |
| Comparative Example E39 | | | | — | | N-methyl-2-pyrrolidone | | Precipitated and solidified after dissolution | — |

What is claimed is:

1. A process of preparing a polyimide comprising effecting an imidization reaction of a diamine and an aromatic tetracarboxylic dianhydride in a solvent containing 50 to 100% by weight of an equimolar composition of a nitrogen-containing cyclic compound indicated by chemical formula (1) below and a phenol indicated by chemical formula (2) below:

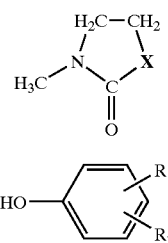

(1)

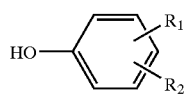

(2)

in formula (1), X represents —$CH_2$— or —$N(CH_3)$—, and in formula (2), $R_1$ and $R_2$ may be the same as, or different from, each other and represent each any one of —H, —OH, —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$OCH_3$, —$O(C_6H_5)$, —$NO_2$, —Cl, —Br and —F.

2. The process of preparing a polyimide according to claim 1, wherein the aromatic tetracarboxylic dianhydride contains a biphenyltetracarboxylic dianhydride.

3. The process of preparing a polyimide according to claim 2, wherein the aromatic tetracarboxylic dianhydride contains 30 to 100 mol % of a biphenyltetracarboxylic dianhydride based on the total amount of the tetracarboxylic dianhydride.

4. The process of preparing a polyimide according to claim 1, wherein the polyimide obtained by the imidization reaction has the repeating structure unit indicated by chemical formula (3) below:

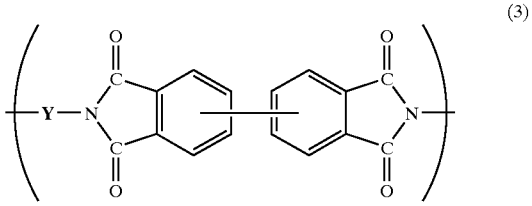

(3)

in formula (3), Y represents at least one member selected from the group consisting of formulas (e) to (h):

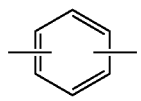

(e)

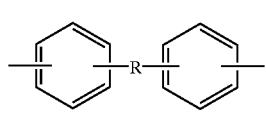

(f)

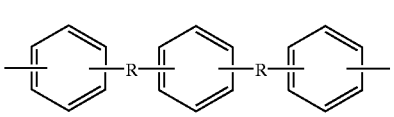

(g)

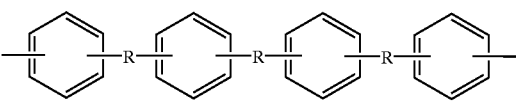

(h)

wherein, R's may be the same as, or different from, each other and represent each any one of a single bond, —O—, —CO—, —$SO_2$—, —S—, —$CH_2$— and —$C(CH_3)_2$—.

5. The process of preparing a polyimide according to claim 4, wherein the total repeating structure units contain 30 to 100 mol % of the repeating structure unit indicated by chemical formula (3) above and contain 0 to 70 mol % of the balance different from the repeating structure unit indicated by chemical formula (3) above.

6. The process of preparing a polyimide according to claim 5, wherein the balance, being a repeating structure unit different from the repeating structure unit indicated by chemical formula (3) above, has a repeating structure unit comprising component units derived from an aromatic tetracarboxylic acid.

7. The process of preparing a polyimide according to claim 6, wherein the repeating structure unit comprising component units derived from an aromatic tetracarboxylic acid is the repeating structure units indicated by chemical formulas (a) and/or (b) below:

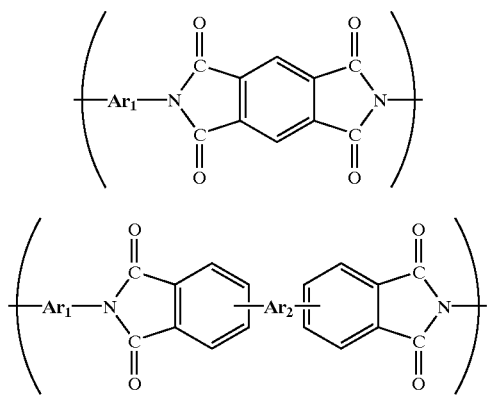

in formulas (a) and (b) above, $Ar_1$ denotes at least one member selected from the group consisting of formulas (e) to (h):

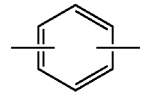

(e)

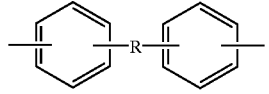

(f)

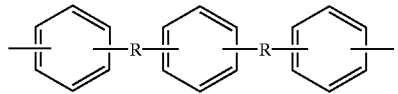

(g)

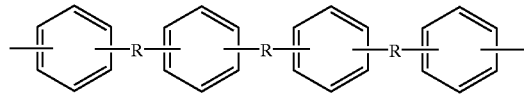

(h)

in formulas (f), (g) and (h), R's may be the same as, or different from, each other and represent each any one of a single bond, —O—, —CO—, —SO$_2$—, —S—, —CH$_2$— and —C(CH$_3$)$_2$—, and in formula (b) above, $Ar_2$ denotes at least one member selected from the group consisting of —O—, —CO—, —SO$_2$—, —S—, —CH$_2$— and —C(CH$_3$)$_2$—.

8. The process of preparing a polyimide according to claim 4, wherein the polyimide having the repeating structure unit indicated by general formula (3) above has at least one of the repeating structure units indicated by general formulas (4) to (6) below:

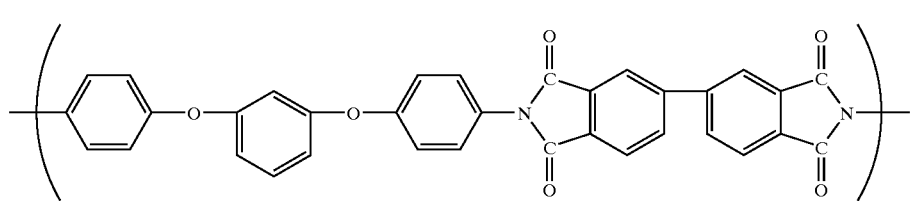

(4)

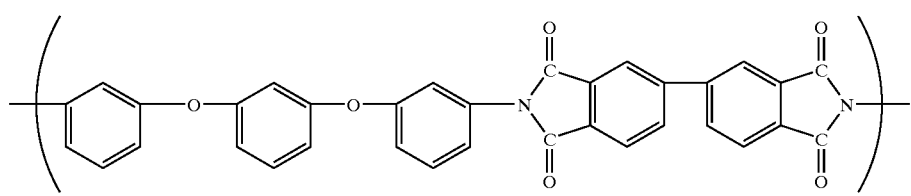

(5)

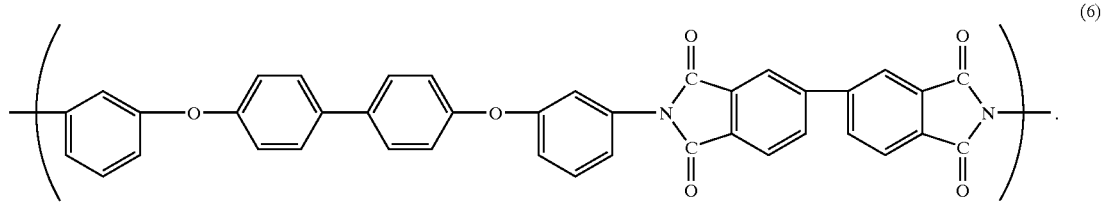

(6)

9. The process of preparing a polyimide according to claim 1, wherein the compound indicated by chemical formula (1) is N-methyl-2-pyrrolidone and/or 1,3'-dimethyl-2-imidazolidinone.

10. The process of preparing a polyimide according to claim 1, wherein the phenol indicated by chemical formula (2) above is at least one compound selected from the group consisting of phenol, o-chlorophenol, m-chlorophenol, p-chlorophenol, o-cresol, m-cresol, p-cresol, 2,3-xylenol, 2,4-xylenol, 2,5-xylenol, 2,6-xylenol, 3,4-xylenol, and 3,5-xylenol.

11. The process of preparing a polyimide according to claim 1, wherein the solvent containing 50 to 100% by weight of an equimolar composition of a compound indicated by chemical formula (1) above and a phenol indicated by chemical formula (2) above contains as the balance thereof 0 to 50% by weight of a compound indicated by chemical formula (1) above or of a phenol indicated by chemical formula (2) above.

12. The process of preparing a polyimide according to claim 1, wherein a polyimide and/or oligomers precipitates during the imidization reaction to make the reaction system slurry.

13. The process of preparing a polyimide according to claim 1, wherein the reaction is carried out in the presence of an end capper.

14. The process of preparing a polyimide according to claim 1, wherein a product precipitates during the imidization reaction to thereby obtain a polyimide powder.

15. The process of preparing a polyimide according to claim 1, wherein the concentration of raw material monomers composed of diamines and tetracarboxylic dianhydrides {((total weight of raw material monomers)/(total weight of raw material monomers+weight of solvent))×100 (%)} in a reaction solution is in the range of 5 to 50% by weight.

16. A polyimide obtained by the process according to claim 1.

17. A polyimide powder obtained by the process according to claim 1.

18. A solvent containing 70 to 100 % by weight of an equimolar composition comprising an equimolar composition of a compound indicated by chemical formula (1) below and a phenol indicated by chemical formula (2) below:

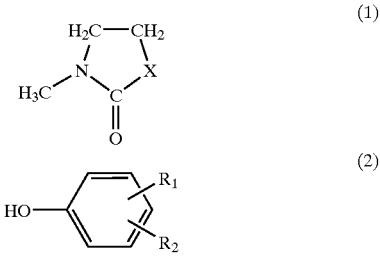

in formula (1), X represents —$CH_2$— or —$N(CH_3)$—, and in formula (2), $R_1$ and $R_2$ may be the same as, or different from, each other and represent each any one of —H, —OH, —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$OCH_3$, —$O(C_6H_5)$, —$NO_2$, —Cl, —Br and —F.

19. The solvent according to claim 18, which contains 80 to 100% by weight of an equimolar composition of a compound indicated by chemical formula (1) above and a phenol indicated by chemical formula (2) above.

20. The process of preparing a polymide according to claim 1, wherein the tetracarboxylic dianhydride contains 30 to 100 mol % of a biphenyltetracarboxylic dianhydride based on the total amount of the tetracarboxylic dianhydride.

* * * * *